United States Patent
Donderici

(10) Patent No.: US 12,384,423 B2
(45) Date of Patent: Aug. 12, 2025

(54) SYSTEMS AND TECHNIQUES FOR OBJECT-BASED SENSOR FUSION

(71) Applicant: GM Cruise Holdings LLC, San Francisco, CA (US)

(72) Inventor: Burkay Donderici, Burlingame, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 267 days.

(21) Appl. No.: 18/179,939

(22) Filed: Mar. 7, 2023

(65) Prior Publication Data

US 2024/0300540 A1    Sep. 12, 2024

(51) Int. Cl.
*B60W 60/00* (2020.01)
*G01S 13/86* (2006.01)
*G01S 15/86* (2020.01)
*G01S 17/86* (2020.01)

(52) U.S. Cl.
CPC ....... *B60W 60/0027* (2020.02); *G01S 13/862* (2013.01); *G01S 13/865* (2013.01); *G01S 13/867* (2013.01); *G01S 15/86* (2020.01); *G01S 17/86* (2020.01); *B60W 2420/403* (2013.01); *B60W 2420/408* (2024.01); *B60W 2420/54* (2013.01); *B60W 2556/35* (2020.02)

(58) Field of Classification Search
CPC ............ B60W 60/00; B60W 60/0027; B60W 2556/35; G01S 15/86; G01S 17/86; G01S 13/862; G01S 13/865
See application file for complete search history.

(56) References Cited

U.S. PATENT DOCUMENTS

| | | | |
|---|---|---|---|
| 10,468,062 B1* | 11/2019 | Levinson | G01S 7/497 |
| 2018/0067487 A1* | 3/2018 | Xu | G05D 1/0278 |
| 2019/0302801 A1* | 10/2019 | Zlot | H04W 4/46 |
| 2021/0331695 A1* | 10/2021 | Ramakrishnan | G06V 10/803 |
| 2022/0080998 A1* | 3/2022 | Kim | B60W 60/001 |
| 2024/0371011 A1* | 11/2024 | Brizzi | G06T 7/277 |

* cited by examiner

*Primary Examiner* — Tan Q Nguyen
(74) *Attorney, Agent, or Firm* — CANTOR COLBURN LLP

(57) ABSTRACT

Systems and techniques are provided for fusing sensor data from multiple sensors. An example method can include obtaining a first set of sensor data from a first sensor and a second set of sensor data from a second sensor; detecting an object in the first set of sensor data and the object in the second set of sensor data; aligning the object in the first set of sensor data and the object in the second set of sensor data to a common time; and based on the aligned object from the first set of sensor data and the aligned object from the second set of sensor data, fusing the aligned object from the first set of sensor data and the aligned object from the second set of sensor data.

18 Claims, 8 Drawing Sheets

SYSTEMS AND TECHNIQUES FOR OBJECT-BASED SENSOR FUSION

TECHNICAL FIELD

The present disclosure generally relates to systems and techniques for sensor fusion. For example, aspects of the disclosure relate to systems and techniques for fusing sensor data and/or objects in sensor data by temporally aligning data from different sensors and/or objects within the data from the different sensors.

BACKGROUND

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow users to obtain sensor data that measures, describes, and/or depicts one or more aspects of a target such as an object, a scene, a person, and/or any other targets. For example, an image sensor can be used to capture frames (e.g., video frames and/or still pictures/images) depicting a target(s) from any electronic device equipped with an image sensor. As another example, a light ranging and detection (LIDAR) sensor can be used to determine ranges (variable distance) of one or more targets by directing a laser to a surface of an entity (e.g., a person, an object, a structure, an animal, etc.) and measuring the time for light reflected from the surface to return to the LIDAR.

In some cases, different sensors and/or sensor modalities can be used to capture aspects of a same scene and/or object(s). However, the different sensors and/or sensor modalities may not be synchronized in time, resulting in the scene and/or object(s) captured by such sensors and/or sensor modalities being temporally misaligned. This temporal misalignment can pose several problems when processing the associated data because processing algorithms generally require all processed objects and/or data to be from a same time (e.g., captured by the respective sensors at a same time or reflect the state of such objects and/or data at a common time) and/or the processing algorithms (e.g., deep neural networks or machine learning algorithms) may be sensitive to how different objects and/or data differ in time.

BRIEF DESCRIPTION OF THE DRAWINGS

Illustrative examples and aspects of the present application are described in detail below with reference to the following figures.

DETAILED DESCRIPTION

Figure 1:
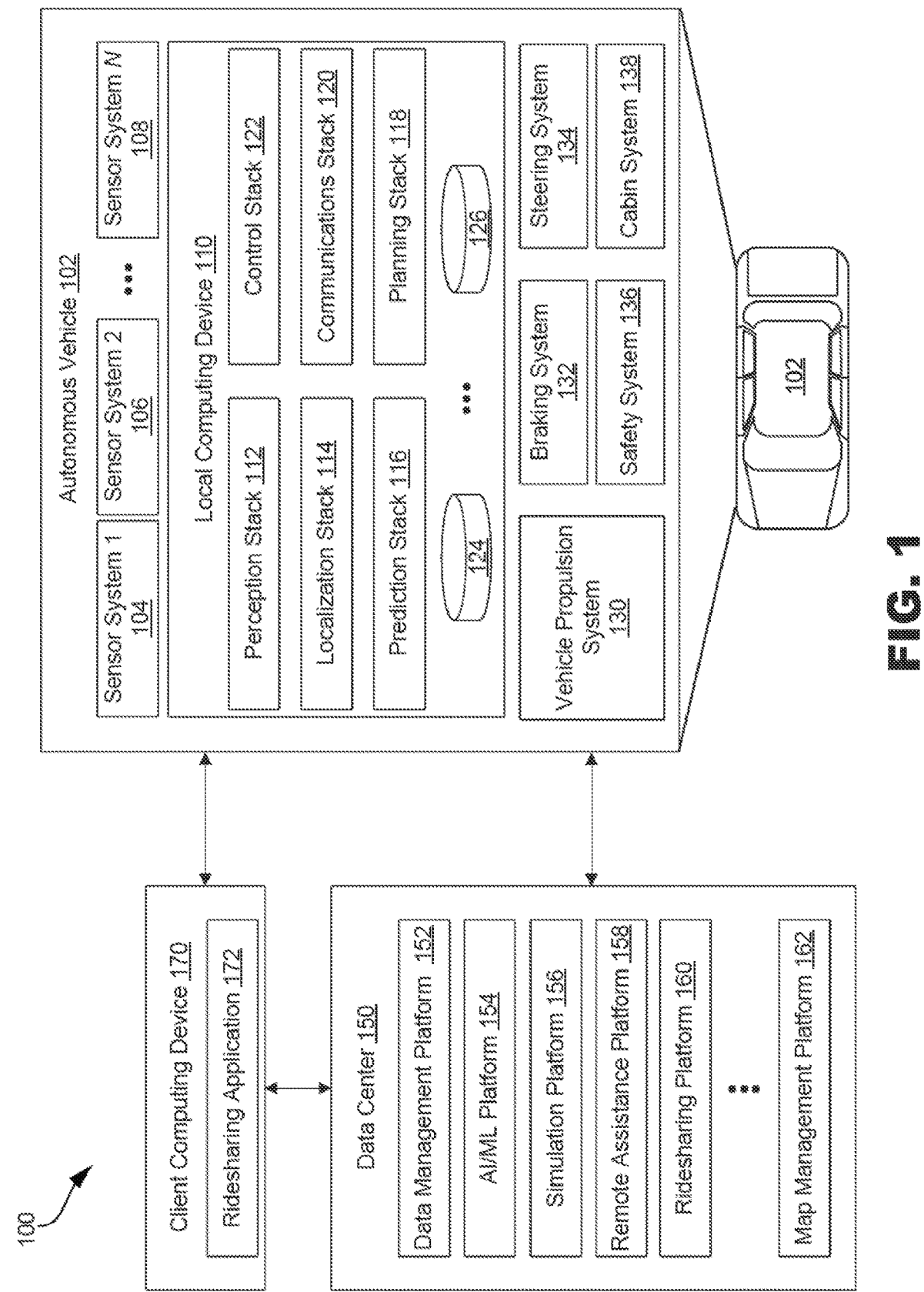
FIG. 1 illustrates an example system environment that can be used to facilitate autonomous navigation and routing operations, according to some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides aspects and examples of the disclosure, and is not intended to limit the scope, applicability, or configuration of the disclosure. Rather, the ensuing description of the aspects and examples of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, sensors are commonly integrated into a wide array of systems and electronic devices. The sensors allow users to obtain sensor data that measures, describes, and/or depicts one or more aspects of a target such as an object, a scene, a person, and/or any other targets. For example, an image sensor can be used to capture frames (e.g., video frames and/or still pictures/images) depicting a target(s) from any electronic device equipped with an image sensor. As another example, a light ranging and detection (LIDAR) sensor can be used to determine ranges (variable distance) of one or more targets by directing a laser to a surface of an entity (e.g., a person, an object, a structure, an animal, etc.) and measuring the time for light reflected from the surface to return to the LIDAR. The sensors can be implemented by a variety of systems for various purposes.

For example, autonomous vehicles (AVs) generally implement numerous sensors for various AV operations, such as a camera sensor, a light detection and ranging (LIDAR) sensor, a radio detection and ranging (RADAR) sensor, an inertial measurement unit (IMU), an acoustic sensor (e.g., sound navigation and ranging (SONAR), microphone, etc.), and/or a global navigation satellite system (GNSS) and/or global positioning system (GPS) receiver, amongst others. The AVs can use the sensors to collect sensor data that the AVs can use for operations such as perception (e.g., object detection, event detection, tracking, localization, sensor fusion, point cloud processing, image processing, etc.), planning (e.g., route planning, trajectory planning, situation analysis, behavioral and/or action planning, mission planning, etc.), control (e.g., steering, braking, throttling, lateral control, longitudinal control, model predictive control (MPC), proportional-derivative-integral, etc.), prediction (e.g., motion prediction, behavior prediction, etc.), etc. The sensors can provide the sensor data to an internal computing system of the AV, which can use the sensor data to control an electrical and/or mechanical system of the AV, such as a vehicle propulsion system, a braking system, and/or a steering system, for example.

The sensors implemented by an AV generally obtain sensor data (e.g., measurements, image data, and/or other sensor data) at different times. Indeed, the sensors may even measure different objects in a same scene at different times, since some sensors such as LIDARs may operate by scanning a scene(s) and/or environment(s) over time. This can pose problems for systems processing the sensor data because the processing algorithms may require the raw sensor data and/or all the objects in the raw sensor data to be from a same time (e.g., to be captured and/or measured at a same or common time and/or to reflect a state of the raw sensor data and/or the objects in the raw sensor data at a same or common time), and/or because the processing algorithms may be sensitive to how raw sensor data and/or objects in the raw sensor data may differ in their respective time. For example, a processing algorithm processing measurements of an input object in sensor data from different sensors may need to ensure that such measurements being processed were obtained by the sensors at a same time or that such measurements reflect a state of the input object at a same time. Otherwise, if the measurements were not obtained by the sensors at a same time or do not reflect a state of the input object at a same time, the processing algorithm may experience errors, failures, inaccuracies, and/or other negative impacts or results.

In AV implementations of sensors, different sensors in the software stack of an AV often operate at different times. For example, a LIDAR sensor of the AV may obtain LIDAR data at certain time intervals (e.g., at 0, 100, and 200 units of time), while the RADAR sensor of the AV may obtain RADAR data at different time intervals (e.g., at 50, 150, and 250 units of time). For a high-speed object (e.g., an object moving at a threshold speed), even a small difference in time can make a significant impact on the state of the object, such as the position of the object in space. For example, if a LIDAR sensor and a RADAR sensor both obtain measurements of a vehicle moving at 60 miles-per-hour (mph), even a 50 millisecond (ms) delay in the measurements and/or the state of the vehicle would introduce a spatial difference of 1.3 meters (m) of the vehicle between the LIDAR data (e.g., the measurements from the LIDAR sensor) and the RADAR data (e.g., the measurements from the RADAR sensor).

In other words, the position in space of the vehicle reflected in RADAR data and LIDAR data having a 50 ms delay relative to each other may differ by 1.3 m if the vehicle is moving at 60 mph, which can cause significant misalignment (e.g., 1.3 m) in the data (e.g., misalignment of the position of the vehicle in the RADAR data relative to the LIDAR data). Such spatial differences (e.g., such misalignments or differences in position) can vary based on a number of factors such as, for example and without limitation, speed, direction, position (e.g., location, orientation, etc.). Moreover, such spatial differences can be difficult to learn with machine learning (ML) algorithms, especially within computational resource or dataset size limitations.

Systems, apparatuses, processes (also referred to as methods), and computer-readable media (collectively referred to as "systems and techniques") are described herein for sensor fusion. In some examples, the systems and techniques described herein can be used to fuse (e.g., combine, merge, blend, synthesize, etc.) data from different sensors and/or objects in the data from the different sensors by temporally aligning the data from the different sensors and/or the objects in the data from the different sensors. The systems and techniques described herein can fuse sensor data from various sensor modalities such as, for example and without limitation, a RADAR sensor, a LIDAR sensor, a camera sensor, an ultrasonic sensor, a time-of-flight (TOF) sensor, and/or any other sensor. In some examples, the systems and techniques described herein can fuse sensor data from multiple sensors of a same modality or multiple sensors of different modalities.

In some cases, the systems and techniques described herein can align the sensor data and/or an object(s) in the sensor data at a common or reference time, such as a future time. In some examples, the systems and techniques described herein can project the state (e.g., the position in space, etc.) of the sensor data from different sensors and/or an object(s) in the sensor data to a common time, such as a future time, based on a predicted trajectory and/or motion of the sensor data and/or the object(s) in the sensor data.

In some aspects, the systems and techniques described herein can predict a trajectory (e.g., position, velocity, acceleration, etc.) of an object(s) depicted and/or measured in sensor data from multiple sensors (e.g., from one or more LIDARs, one or more RADARs, one or more camera sensors, one or more ultrasonic sensors, etc.), and use the predicted trajectory information of each object to project each object to a fixed time, and combine the projected object(s) in the sensor data from the multiple sensors into a single, fused timeframe. In some examples, the fixed time can be a future time relative to a time when the sensor data was captured or a time when a portion of the sensor data from one of the sensors was captured. For example, the fixed time can be the time of the latest/last observation/measurement (e.g., the time when the last/latest sensor measurement from the sensor data was captured by a sensor from the multiple sensors) in order to minimize a reaction time. All or multiple sensor modalities can be fused to a fixed time, such as a latest/last possible time or any other time, which can optimize sensor fusion and tracking efficiency. Moreover, as noted above, in some cases, the systems and techniques described herein can use predicted trajectory information, but in other examples can use current trajectory information.

When projecting sensor data to a future time and/or an object in the sensor data, the systems and techniques described herein can use a common time that is most advantageous to a reaction time for an AV implementing the sensors. For example, the systems and techniques described herein can use a common, future time that provides the greatest amount of reaction time when reacting to something detected in/from the sensor data. In some cases, the systems and techniques described herein can do time extrapolation/interpolation to determine a baseline or reference time profile to project sensor data and/or objects to. In some examples, the baseline or reference time can improve a stability and/or accuracy of the system and/or the fused sensor data.

Examples of the systems and techniques described herein are illustrated in FIG. 1 through FIG. 7 and described below.

In some examples, the systems and techniques described herein for sensor fusion can be implemented by an autonomous vehicle in an autonomous vehicle environment. FIG. 1 illustrates an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include one or more inertial measurement units (IMUs), camera sensors (e.g., still image camera sensors, video camera sensors, etc.), light sensors (e.g., LIDARs, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, time-of-flight (TOF) sensors, seat occupancy sensors, open/closed door sensors, tire pressure sensors, rain sensors, and so forth. For example, the sensor system 104 can include a camera system, the sensor system 106 can include a LIDAR system, and the sensor system 108 can include a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can include multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 172. In some cases, the client computing device 170 can be a customer's mobile computing device or a computing device integrated with the AV 102 (e.g., the local computing device 110). The ridesharing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can, in some instances, include one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
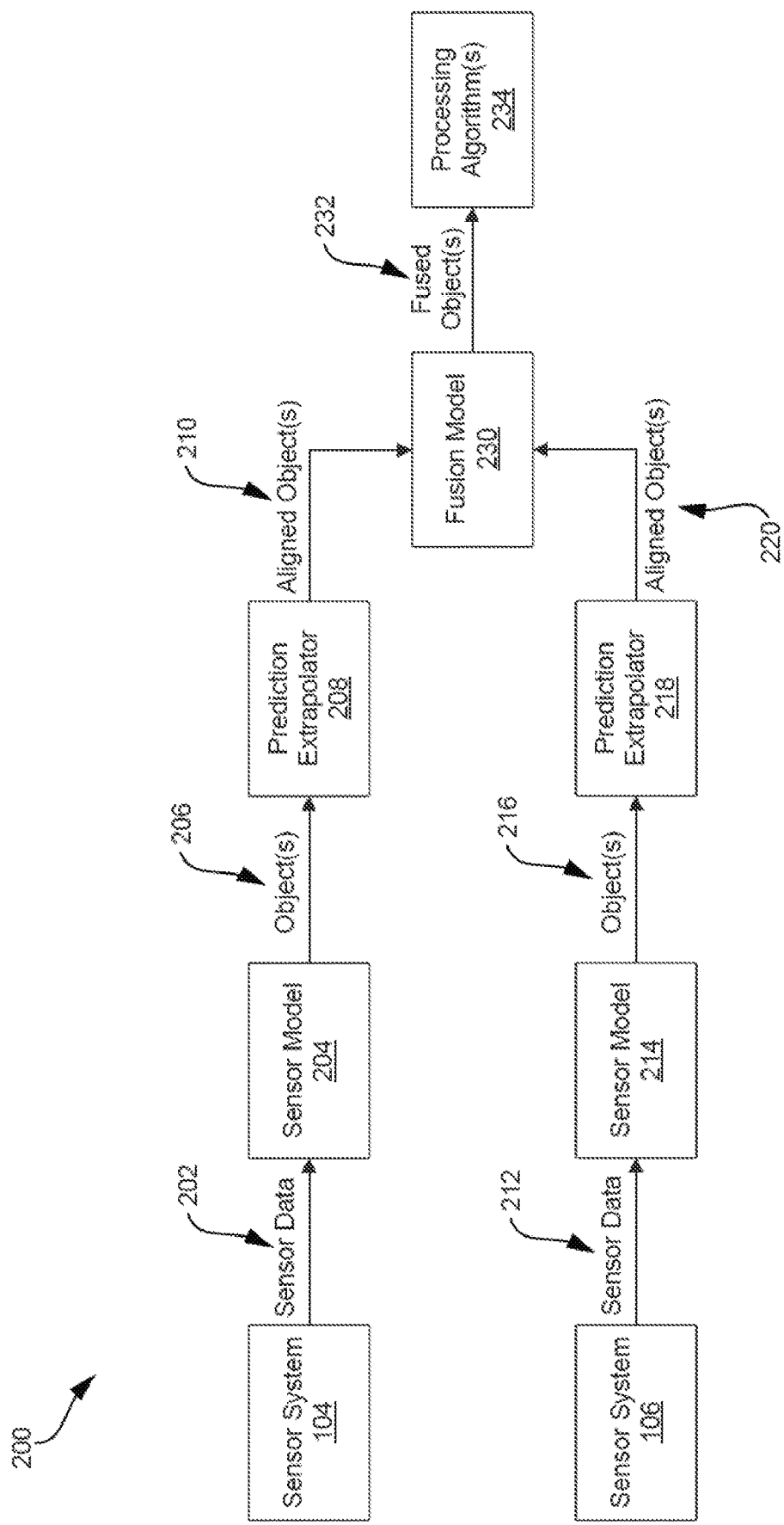
FIG. 2 is a flowchart illustrating an example process for sensor fusion that includes fusing objects in sensor data captured by multiple sensors, according to some examples of the present disclosure.
Figure 3:
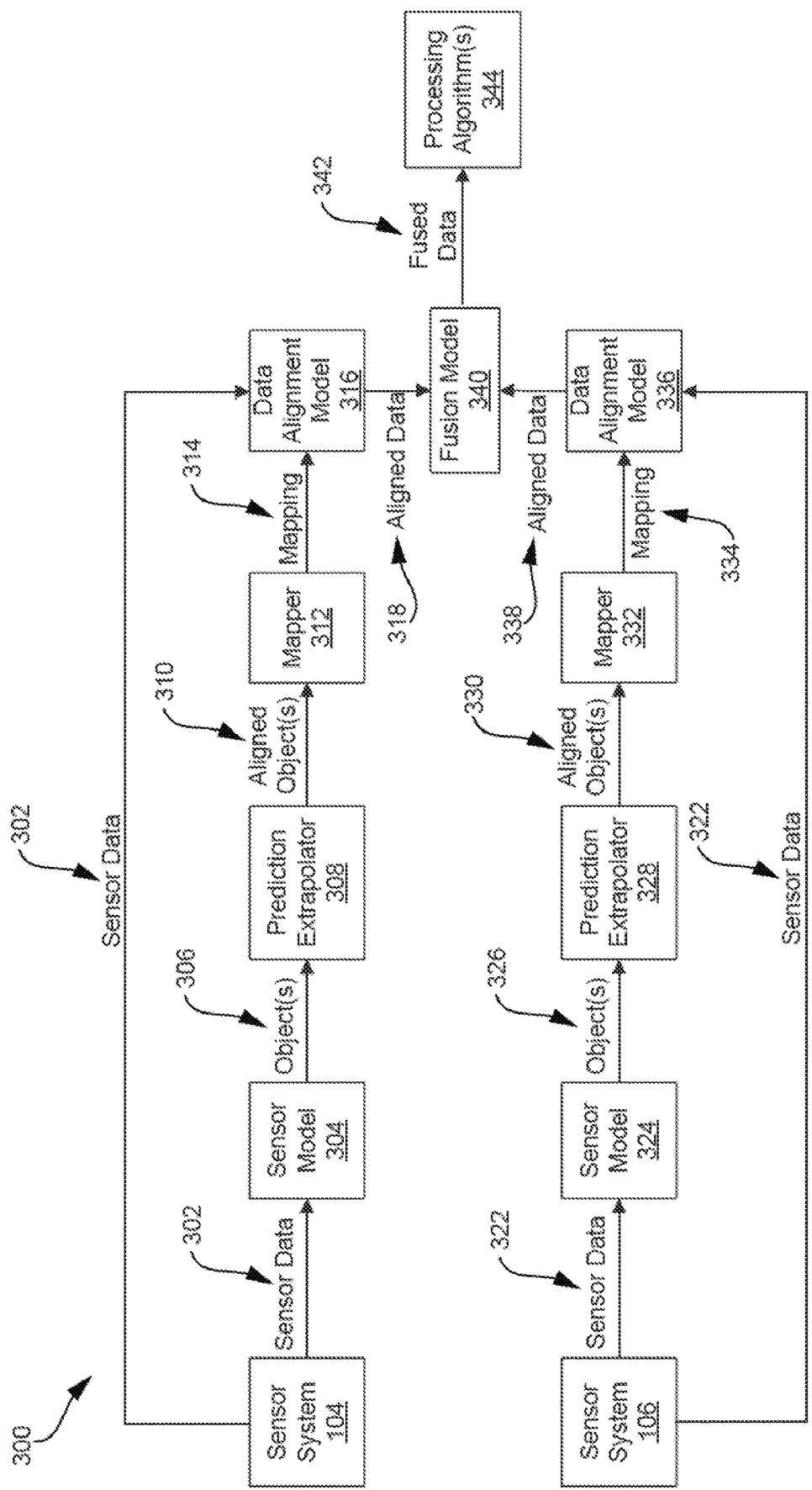
FIG. 3 is a flowchart illustrating an example process for sensor fusion that includes fusing sensor data captured by multiple sensors, according to some examples of the present disclosure.

FIG. 2 is a flowchart illustrating an example process 200 for sensor fusion that includes fusing objects in sensor data captured by multiple sensors, according to some examples of the present disclosure. For example, the process 200 shows an example for fusing an object(s) depicted, measured, represented, captured, and/or included in sensor data obtained from multiple sensors. An example process (e.g., process 300) for fusing the raw and/or entire sensor data (e.g., as opposed to only an object(s) associated with the sensor data) is shown in FIG. 3 and described below. The multiple sensors used to obtain the sensor data in FIG. 2 can include multiple sensors of different modalities or multiple sensors of a same modality. In some examples, the process 200 can be implemented to fuse sensor data obtained by multiple sensors implemented by an AV, such as AV 102, to navigate an environment.

As shown, the sensor system 104 can collect sensor data 202 and provide the sensor data 202 to a sensor model 204 configured to detect an object(s) in the sensor data 202. The sensor system 104 can include any sensor system such as, for example and without limitation, a RADAR sensor, a LIDAR sensor, a camera sensor, an ultrasonic sensor, a wireless sensor (e.g., a WIFI sensor, etc.), an infrared (IR) sensor, a time-of-flight (TOF) sensor, or any other sensor. The sensor data 202 can include data captured by the sensor system 104 such as, for example, image data (e.g., a still image, a video frame, etc.), a point cloud or point cloud data, one or more measurements, acoustic data, one or more frames, a sensor map (e.g., a depth map, a TOF sensor map, a heat map, etc.), an output signal (e.g., a RADAR signal, a distance or proximity sensor signal, etc.), a WIFI environment map (e.g., a WIFI heat map, etc.), a wave or pulse (e.g., a sound wave, etc.), a distance or proximity sensor output, an IR sensor output, or any other sensor output.

The sensor model 204 can process the sensor data 202 and detect an object(s) 206 in the sensor data 202 (e.g., depicted in the sensor data 202, measured in the sensor data 202, represented in the sensor data 202, described in the sensor data 202, contained in the sensor data 202, reflected in the sensor data 202, etc.). For example, the sensor model 204 can process the sensor data 202 and identify a portion of the sensor data that corresponds to the object(s) 206 in the sensor data 202. In some cases, the sensor model 204 can perform segmentation to identify and/or distinguish between a portion(s) of the sensor data 202 corresponding to a background and a portion(s) of the sensor data 202 corresponding to the object(s) 206 and/or a foreground that includes the object(s) 206. In some cases, the sensor model 204 can detect features in the sensor data 202 corresponding to the object(s) 206 and detect the object(s) 206 based on the detected features. The sensor model 204 can also optionally classify the features and/or the combination of features as corresponding to the object(s) 206 and/or the type of object(s) of the object(s) 206. In some cases, the sensor model 204 can generate a bounding box (or any other shape) identifying and/or outlining the region(s) and/or portion(s) of the sensor data 202 that includes the object(s) 206. If the sensor data 202 includes image data, in some examples, the sensor model 204 can perform image processing to detect the object(s) 206 within the image data.

Moreover, the sensor model 204 can be configured to extract the object(s) 206 from the sensor data 202, determine and/or generate a bounding box over a portion of the sensor data 202 that includes the object(s) 206, classify a portion of the sensor data 202 (e.g., one or more pixels, one or more blocks, one or more values, one or more components, one or more features, one or more datapoints, etc.) as belonging and/or including the object(s) 206, determine one or more portions (e.g., one or more datapoints, one or more pixels, one or more features, one or more values, one or more blocks of data, one or more signal components, etc.) of the sensor data 202 corresponding to the object(s) 206, and/or otherwise detect the object(s) 206 in/from the sensor data 202.

The object(s) 206 can include any object in the sensor data 202 and/or associated with the sensor data 202 such as, for example, a pedestrian, a vehicle, a bicycle, a motorcycle, an animal, a sign, a building, a tree, a road or traffic marking, a structure, a cone, a device, or any other object. The sensor model 204 can include any model configured to detect one or more objects in the sensor data 202. In some cases, the sensor model 204 can be configured to process data specific to the type of sensor of the sensor system 104 and detect (e.g., identify, classify, extract, outline, map, segment, recognize, and/or determine) one or more objects in/from the data. In other cases, the sensor model 204 can be configured to process data from multiple types of sensors and detect (e.g., identify, classify, extract, outline, map, segment, recognize, and/or determine) the one or more objects in/from the data.

The sensor model 204 can provide the object(s) 206 detected in the sensor data 202 to a prediction extrapolator 208 configured to align and/or extrapolate the object(s) 206 to and/or based on a reference time. For example, the prediction extrapolator 208 can project the object(s) 206 to a reference time such that the object(s) 206 is aligned and/or repositioned to reflect a predicted position (e.g., location, orientation, etc.) of the object(s) 206 at the reference time. The prediction extrapolator 208 can generate an aligned object(s) 210 based on the object(s) 206 and a predicted trajectory (e.g., position, velocity, acceleration, etc.) of the object(s) 206. To generate the aligned object(s) 210, the prediction extrapolator 208 can project a position of the object(s) 206 to a predicted position where the object(s) 206 is predicted to be at a reference time. The aligned object(s) 210 can thus reflect the predicted position of the object(s) 206 at the reference time.

The prediction extrapolator 208 can include a model(s) configured to receive one or more input objects and align the one or more input objects based on a predicted trajectory (e.g., position, velocity, acceleration, etc.) of the one or more input objects. For example, the prediction extrapolator 208 can include a model(s) configured to predict a trajectory of the object(s) 206 and modify a position of the object(s) 206 to reflect a predicted position of the object(s) 206 at the reference time. The prediction extrapolator 208 can be the same model or the same type of model as a model(s) that is used to predict a trajectory for the fused objects 232 and/or can be part of the processing algorithms 234. This ensures consistency across the process 200 and avoid any cost associated with developing and maintaining two separate prediction models. In other cases, the prediction extrapolator 208 can be separate and/or different from a model(s) that is used to predict a trajectory for the fused objects 232 and/or can be separate from the processing algorithms 234. Moreover, in some cases, the prediction extrapolator 208 may be a variation of the prediction extrapolator that is part of the processing algorithms 234.

In some examples, to generate the aligned object(s) 210, the prediction extrapolator 208 can determine a predicted trajectory of the object(s) 206 and reposition the object(s)

206 based on the predicted trajectory of the object(s) 206. For example, the prediction extrapolator 208 can determine the reference time to which the prediction extrapolator 208 will project the object(s), determine a predicted trajectory of the object(s) 206, and use the predicted trajectory to align the object(s) 206 according to the predicted position of the object(s) 206 at the reference time as determined based on the predicted trajectory of the object(s) 206 and the reference time relative to a time associated with the position of the object(s) reflected in the sensor data 202. The prediction extrapolator 208 can align the object(s) 206 by using the predicted trajectory to project the position of the object(s) 206 from a position of the object(s) 206 reflected in the sensor data 202 to a predicted position of the object(s) 206 at the reference time.

In some cases, to determine the predicted trajectory of the object(s) 206 used to align the object(s) 206 and generate the aligned object(s) 210, the prediction extrapolator 208 can analyze sensor data that includes the object(s) 206 at one or more times to determine motion and/or motion vectors associated with the object(s) 206. The motion and/or motion vectors can reflect motion of the object(s) 206 at the one or more times, which can be used to determine the predicted trajectory used to generate the aligned object(s) 210. The one or more times can include one or more previous times (e.g., relative to a time when the sensor data 202 was captured). In some cases, the one or more times can additionally include a time (e.g., a current time) when the sensor data 202 was captured (e.g., and thus the time associated with a position of the object(s) 206 in the sensor data 202). For example, the prediction extrapolator 208 can determine a motion or motion vectors of the object(s) 206 reflected in sensor data captured by the sensor system 104 at one or more previous times (and, in some cases, a time when the sensor data 202 was captured), such as previous frames captured by the sensor system 104 (and, in some cases, a frame associated with and/or corresponding to the sensor data 202). The motion and/or motion vectors can be used to determine the predicted trajectory used to generate the aligned object(s) 210.

For example, the motion and/or motion vectors can be used to determine a displacement or magnitude of displacement of the object(s) from a position of the object(s) reflected in the sensor data 202 to a predicted position of the object(s) 206 at the reference time. In some examples, the prediction extrapolator 208 can determine a magnitude of change in a trajectory of the object(s) 206 (e.g., a magnitude of change in a position, velocity, speed, and/or acceleration of the object(s) 206), and generate the aligned object(s) 210 by projecting a position of the object(s) 206 to the reference time based on the magnitude of change in the trajectory of the object(s) 206 and a difference (if any) between the time associated with the position of the object(s) 206 reflected in the sensor data 202 and the reference time.

In some cases, the prediction extrapolator 208 can implement a motion estimation algorithm to determine the motion and/or motion vectors associated with the object(s) 206 and/or the predicted trajectory associated with the object(s) 206. In some examples, the prediction extrapolator 208 can implement a translational motion model to predict a trajectory of the object(s) 206. The translational motion model can indicate, for example, the position of the object(s) 206 in previously captured sensor data (e.g., the sensor data 202 and/or other sensor data previously captured) by a motion vector ($\Delta x$, $\Delta y$), with $\Delta x$ specifying the horizontal displacement (if any) of the object(s) 206 and $\Delta y$ specifying the vertical displacement (if any) of the object(s) 206 relative to the position of the object(s) 206 in the sensor data 202 and/or the position of the object(s) 206 at the reference time.

In some examples, the prediction extrapolator 208 can additionally or alternatively include an optical flow algorithm, a Harris corner detection algorithm, a dense motion map estimation algorithm, a semi-global matching algorithm, a computer vision algorithm, and/or any motion estimation and/or trajectory prediction algorithm. For example, the prediction extrapolator 208 can include an optical flow algorithm configured to determine motion information for the object(s) 206 based on a pattern of apparent motion of the object(s) caused by the relative motion between the sensor system 104 and a scene (and/or the object(s) 206) associated with the object(s) 206, and/or a distribution of apparent positions, velocities of movement, and/or acceleration of one or more portions of sensor data, such as a region associated with the object(s) 206 and/or a pattern associated with the object(s) 206. In some examples, the motion information and/or a magnitude of motion associated with the motion information can represent or can be used to determine the predicted trajectory of the object(s) used to align the object(s) 206.

In some cases, the predicted trajectory of the object(s) 206 can include a predicted position of the object(s) 206, a velocity of the object(s) 206, an acceleration of the object(s) 206, and/or any other motion information associated with the object(s) 206. Moreover, the predicted trajectory of the object(s) 206 can include motion information for forward and/or backward prediction directions, which can depend on the reference time relative to a time associated with the sensor data 202 (e.g., a future time or a previous time). For example, the reference time can include a future time and the predicted trajectory can include motion information for a forward prediction direction. In some illustrative aspects, the term "forward" in the forward prediction direction can have a geometrical meaning (e.g., a future position, a current position relative to a previous position, etc.), a meaning in terms of time (e.g., a future time, a current time relative to a previous time associated with the object(s) 206 and/or sensor data used to determine the predicted trajectory, etc.), and/or a meaning in terms of predicted data and/or a predicted object(s) associated with the predicted trajectory, such as a future or forward frame (or any other future or forward sensor data), a current frame (or any other current sensor data), etc.

After generating the aligned object(s) 210, the prediction extrapolator 208 can provide the aligned object(s) 210 to a fusion model 230 configured to fuse the aligned object(s) 210 with aligned object(s) 220 generated based on sensor data from a different sensor (e.g., sensor system 106), as further described below. The aligned object(s) 210 and the aligned object(s) 220 described below can represent a same object in/from sensor data captured using different sensors (e.g., different sensors of a same or different modality), as further described herein. Moreover, the aligned object(s) 210 and the aligned object(s) 220 can be aligned or projected to a same reference time. By aligning an object to the same reference time, the fusion model 230 can fuse the aligned objects, as the aligned objects represent the same object captured, measured, etc., using different sensors and projected to a predicted position at a common time (e.g., the same reference time). The fused object(s) generated using the aligned objects corresponding to a same object and a common time can allow one or more algorithms to process data corresponding to a same object obtained from multiple sensors, while preventing or minimizing errors or issues caused by temporal and/or spatial misalignment of the objects used to generated the fused object. Also, the fused object can be more robust, detailed, accurate, reliable, etc., than the same object from a single sensor (e.g., rather than from multiple sensors). Similarly, the data from the multiple sensors depicting, including, measuring, describing, and/or representing the object (e.g., the same object) that is used to generate the fused object can be more robust, detailed, accurate, reliable, etc., than the data from a single sensor depicting, including, measuring, describing, and/or representing that object.

In addition to the foregoing, the sensor system 106 can collect sensor data 212 and provide the sensor data 212 to a sensor model 214 configured to detect an object(s) in the sensor data 212. The sensor system 106 can include any sensor system such as, for example and without limitation, a RADAR sensor, a LIDAR sensor, a camera sensor, an ultrasonic sensor, a wireless sensor (e.g., a WIFI sensor, etc.), an infrared (IR) sensor, a time-of-flight (TOF) sensor, or any other sensor. In some examples, the sensor system 106 can be a different type of sensor than the sensor system 104. In other examples, the sensor system 106 can be a same type of sensor as the sensor system 104.

The sensor data 212 can include data captured by the sensor system 106 such as, for example, image data (e.g., a still image, a video frame, etc.), a point cloud or point cloud data, one or more measurements, acoustic data, one or more frames, a sensor map (e.g., a depth map, a TOF sensor map, a heat map, etc.), an output signal (e.g., a RADAR signal, a distance or proximity sensor signal, etc.), a WIFI environment map (e.g., a WIFI heat map, etc.), a wave or pulse (e.g., a sound wave, etc.), a distance or proximity sensor output, an IR sensor output, or any other sensor output. The sensor model 214 can process the sensor data 212 and detect an object(s) 216 in the sensor data 212 (e.g., depicted in the sensor data 212, measured in the sensor data 212, represented in the sensor data 212, described in the sensor data 212, contained in the sensor data 212, reflected in the sensor data 212, etc.). For example, the sensor model 214 can process the sensor data 212 and identify a portion of the sensor data that corresponds to the object(s) 216 in the sensor data 212. The object(s) 216 can represent a same object as the object(s) 206. For example, the object(s) 206 and the object(s) 216 can both represent a same vehicle, pedestrian, traffic sign, building, animal, structure, bicycle, tree, and/or any other object.

In some cases, the sensor model 214 can perform segmentation to identify and/or distinguish between a portion(s) of the sensor data 212 corresponding to a background and a portion(s) of the sensor data 212 corresponding to the object(s) 216 and/or a foreground that includes the object(s) 216. In some examples, if the sensor data 212 includes image data, the sensor model 214 can perform image processing to detect the object(s) 216 within the image data. Moreover, the sensor model 214 can be configured to extract the object(s) 216 from the sensor data 212, determine and/or generate a bounding box over a portion of the sensor data 212 that includes the object(s) 216, classify a portion of the sensor data 212 (e.g., one or more pixels, one or more blocks, one or more values, one or more components, one or more features, one or more datapoints, etc.) as belonging and/or including the object(s) 216, determine one or more portions (e.g., one or more datapoints, one or more pixels, one or more features, one or more values, one or more blocks of data, one or more signal components, etc.) of the sensor data 212 corresponding to the object(s) 216, and/or otherwise detect the object(s) 216 in/from the sensor data 212.

The sensor model 214 can include any model configured to detect one or more objects in the sensor data 212. In some cases, the sensor model 214 can be configured to process data specific to the type of sensor of the sensor system 106 and detect (e.g., identify, classify, extract, outline, map, segment, recognize, and/or determine) one or more objects in/from the data. In other cases, the sensor model 214 can be configured to process data from multiple types of sensors and detect (e.g., identify, classify, extract, outline, map, segment, recognize, and/or determine) the one or more objects in/from the data. In some examples, the sensor model 214 can represent the same model as the sensor model 204 or a same type of model as the sensor model 204. In other examples, the sensor model 214 can represent a different model as the sensor model 204 or a different type of model than the sensor model 204.

The sensor model 214 can provide the object(s) 216 detected in the sensor data 212 to a prediction extrapolator 218 configured to align and/or extrapolate the object(s) 216 to and/or based on a reference time. For example, the prediction extrapolator 218 can project the object(s) 216 to a reference time such that the object(s) 216 is aligned and/or repositioned to reflect a predicted position (e.g., location, orientation, etc.) of the object(s) 216 at the reference time. The prediction extrapolator 218 can generate an aligned object(s) 220 based on the object(s) 216 and a predicted trajectory (e.g., position, velocity, acceleration, etc.) of the object(s) 216. To generate the aligned object(s) 220, the prediction extrapolator 218 can project a position of the object(s) 216 to a predicted position where the object(s) 216 is predicted to be at a reference time. The aligned object(s) 220 can thus reflect the predicted position of the object(s) 216 at the reference time.

The aligned object(s) 220 can represent the same object as the aligned object(s) 210, and can be aligned to (e.g., projected to, updated based on, etc.) a same time (e.g., the reference time) as the aligned object(s) 210. In other words, the aligned object(s) 220 and the aligned object(s) 210 can both include the same object and reflect a predicted position of that object at a common time (e.g., the reference time). The reference time can represent a future time relative to a time associated with the position of the object(s) 206 in the sensor data 202 and a time associated with the position of the object(s) 216 in the sensor data 212. In other cases, the reference time can correspond to the time associated with the position of the object(s) 206 in the sensor data 202 or a time associated with the position of the object(s) 216 in the sensor data 212.

The prediction extrapolator 218 can include a model(s) configured to receive one or more input objects and align the one or more input objects based on a predicted trajectory (e.g., position, velocity, acceleration, etc.) of the one or more input objects. For example, the prediction extrapolator 218 can include a model(s) configured to predict a trajectory of the object(s) 216 and modify a position of the object(s) 216 to reflect a predicted position of the object(s) 216 at the reference time.

In some examples, to generate the aligned object(s) 220, the prediction extrapolator 218 can determine a predicted trajectory of the object(s) 216 and reposition the object(s) 216 based on the predicted trajectory of the object(s) 216. For example, the prediction extrapolator 218 can determine the reference time to which the prediction extrapolator 218 will project the object(s), determine a predicted trajectory of the object(s) 216, and use the predicted trajectory to align the object(s) 216 based on the predicted trajectory of the object(s) 216 and the reference time relative to a time associated with the position of the object(s) reflected in the sensor data 212. The prediction extrapolator 218 can align the object(s) 216 by using the predicted trajectory to project the position of the object(s) 216 from a position of the object(s) 216 reflected in the sensor data 212 to a predicted position of the object(s) 216 at the reference time.

In some cases, to determine the predicted trajectory of the object(s) 216 used to align the object(s) 216 and generate the aligned object(s) 220, the prediction extrapolator 218 can analyze sensor data that includes the object(s) 216 at one or more times to determine motion and/or motion vectors associated with the object(s) 216. The motion and/or motion vectors can reflect motion of the object(s) 216 at the one or more times, which can be used to determine the predicted trajectory used to generate the aligned object(s) 220. The one or more times can include one or more previous times (e.g., relative to a time when the sensor data 212 was captured). In some cases, the one or more times can additionally include a time (e.g., a current time) when the sensor data 212 was captured (e.g., and thus the time associated with a position of the object(s) 216 in the sensor data 212). For example, the prediction extrapolator 218 can determine a motion or motion vectors of the object(s) 216 reflected in sensor data captured by the sensor system 106 at one or more previous times (and, in some cases, a time when the sensor data 212 was captured), such as previous frames captured by the sensor system 106 (and, in some cases, a frame associated with and/or corresponding to the sensor data 212). The motion and/or motion vectors can be used to determine the predicted trajectory used to generate the aligned object(s) 220.

For example, the motion and/or motion vectors can be used to determine a displacement or magnitude of displacement of the object(s) from a position of the object(s) reflected in the sensor data 212 to a predicted position of the object(s) 216 at the reference time. In some examples, the prediction extrapolator 218 can determine a magnitude of change in a trajectory of the object(s) 216 (e.g., a magnitude of change in a position, velocity, speed, and/or acceleration of the object(s) 216), and generate the aligned object(s) 220 by projecting a position of the object(s) 216 to the reference time based on the magnitude of change in the trajectory of the object(s) 216 and a difference (if any) between the time associated with the position of the object(s) 216 reflected in the sensor data 212 and the reference time.

In some cases, the prediction extrapolator 218 can implement a motion estimation algorithm to determine the motion and/or motion vectors associated with the object(s) 216 and/or the predicted trajectory associated with the object(s) 216. In some examples, the prediction extrapolator 218 can implement a translational motion model to predict a trajectory of the object(s) 216. The translational motion model can indicate, for example, the position of the object(s) 216 in previously captured sensor data (e.g., the sensor data 212 and/or other sensor data previously captured) by a motion vector (Δx, Δy), with Δx specifying the horizontal displacement (if any) of the object(s) 216 and Δy specifying the vertical displacement (if any) of the object(s) 216 relative to the position of the object(s) 216 in the sensor data 212 and/or the position of the object(s) 216 at the reference time.

In some examples, the prediction extrapolator 218 can additionally or alternatively include an optical flow algorithm, a Harris corner detection algorithm, a dense motion map estimation algorithm, a semi-global matching algorithm, a computer vision algorithm, and/or any motion estimation and/or trajectory prediction algorithm. For example, the prediction extrapolator 218 can include an optical flow algorithm configured to determine motion information for the object(s) 216 based on a pattern of apparent motion of the object(s) caused by the relative motion between the sensor system 106 and a scene (and/or the object(s) 216) associated with the object(s) 216, and/or a distribution of apparent positions, velocities of movement, and/or acceleration of one or more portions of sensor data, such as a region associated with the object(s) 216 and/or a pattern associated with the object(s) 216. In some examples, the motion information and/or a magnitude of motion associated with the motion information can represent or can be used to determine the predicted trajectory of the object(s) used to align the object(s) 216.

In some cases, the predicted trajectory of the object(s) 216 can include a predicted position of the object(s) 216, a velocity of the object(s) 216, an acceleration of the object(s) 216, and/or any other motion information associated with the object(s) 216. Moreover, the predicted trajectory of the object(s) 216 can include motion information for forward and/or backward prediction directions, which can depend on the reference time relative to a time associated with the sensor data 212 (e.g., a future time or a previous time). For example, the reference time can include a future time and the predicted trajectory can include motion information for a forward prediction direction. In some illustrative aspects, the term "forward" in the forward prediction direction can have a geometrical meaning (e.g., a future position, a current position relative to a previous position, etc.), a meaning in terms of time (e.g., a future time, a current time relative to a previous time associated with the object(s) 216 and/or sensor data used to determine the predicted trajectory, etc.), and/or a meaning in terms of predicted data and/or a predicted object(s) associated with the predicted trajectory, such as a future or forward frame (or any other future or forward sensor data), a current frame (or any other current sensor data), etc.

After generating the aligned object(s) 220, the prediction extrapolator 218 can provide the aligned object(s) 220 to the fusion model 230. The fusion model 230 can receive the aligned object(s) 210 and the aligned object(s) 220 and generate a fused object(s) 232. The fused object(s) 232 can represent the same object as the aligned object(s) 210 and the aligned object(s) 220 at a predicted position associated with the reference time. In some examples, the fused object(s) 232 can include one or more pixels, datapoints, regions, values, and/or portions of each of the aligned object(s) 210 and the aligned object(s) 220.

The fusion model 230 can generate the fused object(s) 232 by merging or combining the aligned object(s) 210 and the aligned object(s) 220. For example, in some cases, the fusion model 230 can determine a correspondence or mapping between pixels, datapoints, regions, values, and/or portions corresponding to the aligned object(s) 210 and the aligned object(s) 220, and blend, merge, or combine the corresponding or mapped pixels, datapoint, regions, values, and/or portions of the aligned object(s) 210 and the aligned object(s) 220. The fusion model 230 may concatenate the aligned objects 210 and 220 and feed the concatenated data (e.g., the concatenated aligned objects 210 and 220) to a machine learning model. The fusion model 230 may also use an aggregating function on the aligned objects 210 and 220 such as sum, mean, min or max functions, for example.

The fusion model 230 can then provide the fused object(s) 232 to a processing algorithm(s) 234 configured to use the fused object(s) 232 to perform a calculation, generate data, perform an action, and/or otherwise generate an output and/or result. For example, in some cases, the processing algorithm(s) 234 can represent one or more prediction and/or planning algorithms used by an AV (e.g., AV 102) to perform one or more AV prediction and/or planning tasks, operations, calculations, etc. In this example, the fusion model 230 can provide the fused object(s) 232 to the processing algorithm(s) 234 to use the fused object(s) 232 to perform the one or more AV prediction and/or planning tasks, operations, calculations, etc. In some examples, the fused object(s) 232 and/or information/insights provided by the fused object(s) 232 can be more robust, detailed, descriptive, accurate, and/or reliable than the single object(s) 206 in the sensor data 202 and the single object(s) 216 in the sensor data 212.

FIG. 3 is a flowchart illustrating an example process 300 for sensor fusion that includes fusing sensor data captured by multiple sensors, according to some examples of the present disclosure. In this example, the process 300 shows using aligned objects from the sensor data to align and fuse the sensor data from the multiple sensors. The multiple sensors used to obtain the sensor data in FIG. 3 can include multiple sensors of different modalities or multiple sensors of a same modality. In some examples, the process 300 can be implemented to fuse sensor data obtained by multiple sensors implemented by an AV, such as AV 102, to navigate an environment.

As shown, the sensor system 104 can collect sensor data 302 and provide the sensor data 302 to a sensor model 304 configured to detect an object(s) in the sensor data 302. The sensor system 104 can include any sensor system such as, for example and without limitation, a RADAR sensor, a LIDAR sensor, a camera sensor, an ultrasonic sensor, a wireless sensor (e.g., a WIFI sensor, etc.), an IR sensor, a TOF sensor, or any other sensor. The sensor data 302 can include data captured by the sensor system 104 such as, for example, image data (e.g., a still image, a video frame, etc.), a point cloud or point cloud data, one or more measurements, acoustic data, one or more frames, a sensor map (e.g., a depth map, a TOF sensor map, a heat map, etc.), an output signal (e.g., a RADAR signal, a distance or proximity sensor signal, etc.), a WIFI environment map (e.g., a WIFI heat map, etc.), a wave or pulse (e.g., a sound wave, etc.), a distance or proximity sensor output, an IR sensor output, or any other sensor output.

The sensor model 304 can process the sensor data 302 and detect an object(s) 306 in the sensor data 302 (e.g., depicted in the sensor data 302, measured in the sensor data 302, represented in the sensor data 302, captured in the sensor data 302, described in the sensor data 302, contained in the sensor data 302, reflected in the sensor data 302, etc.). For example, the sensor model 304 can process the sensor data 302 and identify a portion of the sensor data that corresponds to the object(s) 306 in the sensor data 302. In some cases, the sensor model 304 can perform segmentation to identify and/or distinguish between a portion(s) of the sensor data 302 corresponding to a background and a portion(s) of the sensor data 302 corresponding to the object(s) 306 and/or a foreground that includes the object(s) 306.

In some cases, the sensor model 304 can detect features in the sensor data 302 corresponding to the object(s) 306 and detect the object(s) 306 based on the detected features. The sensor model 304 can also optionally classify the features and/or the combination of features as corresponding to the object(s) 306 and/or the type of object(s) of the object(s) 306. In some cases, the sensor model 304 can generate a bounding box (or any other shape) identifying and/or outlining the region(s) and/or portion(s) of the sensor data 302 that includes the object(s) 306. If the sensor data 302 includes image data, in some examples, the sensor model 304 can perform image processing to detect the object(s) 306 within the image data.

The sensor model 304 can be configured to extract the object(s) 306 from the sensor data 302, determine and/or generate a bounding box over a portion of the sensor data 302 that includes the object(s) 306, classify a portion of the sensor data 302 (e.g., one or more pixels, one or more blocks, one or more values, one or more components, one or more features, one or more datapoints, etc.) as belonging and/or including the object(s) 306, determine one or more portions (e.g., one or more datapoints, one or more pixels, one or more features, one or more values, one or more blocks of data, one or more signal components, etc.) of the sensor data 302 corresponding to the object(s) 306, and/or otherwise detect the object(s) 306 in/from the sensor data 302.

The object(s) 306 can include any object in the sensor data 302 and/or associated with the sensor data 302 such as, for example, a pedestrian, a vehicle, a bicycle, a motorcycle, an animal, a sign, a building, a tree, a road or traffic marking, a structure, a cone, a device, or any other object. The sensor model 304 can be the same as or different than the sensor model 204 shown in FIG. 2. Moreover, the sensor model 304 can include any model configured to detect one or more objects in the sensor data 302. In some cases, the sensor model 304 can be configured to process data specific to the type of sensor of the sensor system 104 and detect (e.g., identify, classify, extract, outline, map, segment, recognize, and/or determine) one or more objects in/from the data. In other cases, the sensor model 304 can be configured to process data from multiple types of sensors and detect (e.g., identify, classify, extract, outline, map, segment, recognize, and/or determine) the one or more objects in/from the data.

The sensor model 304 can provide the object(s) 306 detected in the sensor data 302 to a prediction extrapolator 308 configured to align and/or extrapolate the object(s) 306 to and/or based on a reference time. For example, the prediction extrapolator 308 can project the object(s) 306 to a reference time such that the object(s) 306 is aligned and/or repositioned to reflect a predicted position (e.g., location, orientation, etc.) of the object(s) 306 at the reference time. The prediction extrapolator 308 can generate an aligned object(s) 310 based on the object(s) 306 and a predicted trajectory (e.g., position, velocity, acceleration, etc.) of the object(s) 306. To generate the aligned object(s) 310, the prediction extrapolator 308 can project a position of the object(s) 306 to a predicted position where the object(s) 306 is predicted to be at a reference time. The aligned object(s) 310 can thus reflect the predicted position of the object(s) 306 at the reference time.

The prediction extrapolator 308 can be the same as or different than the prediction extrapolator 208 shown in FIG. 2. Moreover, the prediction extrapolator 308 can include a model(s) configured to receive one or more input objects and align the one or more input objects based on a predicted trajectory (e.g., position, velocity, acceleration, etc.) of the one or more input objects. For example, the prediction extrapolator 308 can include a model(s) configured to predict a trajectory of the object(s) 306 and modify a position of the object(s) 306 to reflect a predicted position of the object(s) 306 at the reference time.

In some examples, to generate the aligned object(s) 310, the prediction extrapolator 308 can determine a predicted trajectory of the object(s) 306 and reposition the object(s) 306 based on the predicted trajectory of the object(s) 306. For example, the prediction extrapolator 308 can determine the reference time to which the prediction extrapolator 308 will project the object(s), determine a predicted trajectory of the object(s) 306, and use the predicted trajectory to align the object(s) 306 according to the predicted position of the object(s) 306 at the reference time as determined based on the predicted trajectory of the object(s) 306 and the reference time relative to a time associated with the position of the object(s) reflected in the sensor data 302. The prediction extrapolator 308 can align the object(s) 306 by using the predicted trajectory to project the position of the object(s) 306 from a position of the object(s) 306 reflected in the sensor data 302 to a predicted position of the object(s) 306 at the reference time.

In some cases, to determine the predicted trajectory of the object(s) 306 used to align the object(s) 306 and generate the aligned object(s) 310, the prediction extrapolator 308 can analyze sensor data that includes the object(s) 306 at one or more times to determine motion and/or motion vectors associated with the object(s) 306. The motion and/or motion vectors can reflect motion of the object(s) 306 at the one or more times, which can be used to determine the predicted trajectory used to generate the aligned object(s) 310. The one or more times can include one or more previous times (e.g., relative to a time when the sensor data 302 was captured). In some cases, the one or more times can additionally include a time (e.g., a current time) when the sensor data 302 was captured (e.g., and thus the time associated with a position of the object(s) 306 in the sensor data 302). For example, the prediction extrapolator 308 can determine a motion or motion vectors of the object(s) 306 reflected in sensor data captured by the sensor system 104 at one or more previous times (and, in some cases, a time when the sensor data 302 was captured), such as previous frames captured by the sensor system 104 (and, in some cases, a frame associated with and/or corresponding to the sensor data 302). The motion and/or motion vectors can be used to determine the predicted trajectory used to generate the aligned object(s) 310.

For example, the motion and/or motion vectors can be used to determine a displacement or magnitude of displacement of the object(s) from a position of the object(s) reflected in the sensor data 302 to a predicted position of the object(s) 306 at the reference time. In some examples, the prediction extrapolator 308 can determine a magnitude of change in a trajectory of the object(s) 306 (e.g., a magnitude of change in a position, velocity, speed, and/or acceleration of the object(s) 306), and generate the aligned object(s) 310 by projecting a position of the object(s) 306 to the reference time based on the magnitude of change in the trajectory of the object(s) 306 and a difference (if any) between the time associated with the position of the object(s) 306 reflected in the sensor data 302 and the reference time.

In some cases, the prediction extrapolator 308 can implement a motion estimation algorithm to determine the motion and/or motion vectors associated with the object(s) 306 and/or the predicted trajectory associated with the object(s) 306. In some examples, the prediction extrapolator 308 can implement a translational motion model to predict a trajectory of the object(s) 306. The translational motion model can indicate, for example, the position of the object(s) 306 in previously captured sensor data (e.g., the sensor data 302 and/or other sensor data previously captured) by a motion vector ($\Delta x, \Delta y$), with $\Delta x$ specifying the horizontal displacement (if any) of the object(s) 306 and $\Delta y$ specifying the vertical displacement (if any) of the object(s) 306 relative to the position of the object(s) 306 in the sensor data 302 and/or the position of the object(s) 306 at the reference time.

In some examples, the prediction extrapolator 308 can additionally or alternatively include an optical flow algorithm, a Harris corner detection algorithm, a dense motion map estimation algorithm, a semi-global matching algorithm, a computer vision algorithm, and/or any motion estimation and/or trajectory prediction algorithm. For example, the prediction extrapolator 308 can include an optical flow algorithm configured to determine motion information for the object(s) 306 based on a pattern of apparent motion of the object(s) caused by the relative motion between the sensor system 104 and a scene (and/or the object(s) 306) associated with the object(s) 306, and/or a distribution of apparent positions, velocities of movement, and/or acceleration of one or more portions of sensor data, such as a region associated with the object(s) 306 and/or a pattern associated with the object(s) 306. In some examples, the motion information and/or a magnitude of motion associated with the motion information can represent or can be used to determine the predicted trajectory of the object(s) used to align the object(s) 306.

In some cases, the predicted trajectory of the object(s) 306 can include a predicted position of the object(s) 306, a velocity of the object(s) 306, an acceleration of the object(s) 306, and/or any other motion information associated with the object(s) 306. Moreover, the predicted trajectory of the object(s) 306 can include motion information for forward and/or backward prediction directions, which can depend on the reference time relative to a time associated with the sensor data 302 (e.g., a future time or a previous time). For example, the reference time can include a future time and the predicted trajectory can include motion information for a forward prediction direction. In some illustrative aspects, the term "forward" in the forward prediction direction can have a geometrical meaning (e.g., a future position, a current position relative to a previous position, etc.), a meaning in terms of time (e.g., a future time, a current time relative to a previous time associated with the object(s) 306 and/or sensor data used to determine the predicted trajectory, etc.), and/or a meaning in terms of predicted data and/or a predicted object(s) associated with the predicted trajectory, such as a future or forward frame (or any other future or forward sensor data), a current frame (or any other current sensor data), etc.

After generating the aligned object(s) 310, the prediction extrapolator 308 can provide the aligned object(s) 310 to a mapper 312 configured to use the aligned object(s) 310 to generate a mapping 314 that maps portions, regions, blocks, pixels, datapoints, and/or features of the aligned object(s) 310 to corresponding portions, regions, blocks, pixels, datapoints, and/or features of the object(s) 306. For example, the mapper 312 can compare the aligned object(s) 310 with the object(s) 306 to determine a correspondence between portions, regions, blocks, pixels, datapoints, and/or features of the aligned object(s) 310 and the object(s) 306. To illustrate, the mapper 312 can identify, for each pixel or datapoint of the aligned object(s) 310, which pixel or datapoint of the object(s) 306 matches and/or corresponds to that pixel or datapoint of the aligned object(s) 310.

In some cases, the mapping 314 can map portions, regions, blocks, pixels, datapoints, and/or features of the object(s) 306 to corresponding portions, regions, blocks, pixels, datapoints, and/or features of the aligned object(s) 310. Each corresponding portion, region, block, pixel, datapoint, and/or feature of the aligned object(s) can be or represent a particular (e.g., a matching, etc.) portion, region, block, pixel, datapoint, and/or feature of the object(s) 306. For example, a datapoint in the aligned object(s) 310 corresponding to a datapoint in the object(s) 306 can be the datapoint in the object(s) 306 as contained in the aligned object(s) 310 (e.g., can be the same datapoint after the datapoint is aligned and/or projected to the reference time associated with the aligned object(s) 310).

In some aspects, the mapping 314 can map portions, regions, blocks, pixels, datapoints, and/or features of the object(s) 306 to corresponding portions, regions, blocks, pixels, datapoints, and/or features of the aligned object(s) 310 as previously described. In other aspects, the mapping 314 can additionally map other portions, regions, blocks, pixels, datapoints, and/or features of the sensor data 302 (e.g., other portions, regions, blocks, pixels, datapoints, and/or features that do not include or correspond to the object(s) 306) to other corresponding portions, regions, blocks, pixels, datapoints, and/or features of the sensor data aligned and/or projected to the reference time associated with the aligned object(s) 310. In some examples, by identifying a correspondence between portions, regions, blocks, pixels, datapoints, and/or features of the aligned object(s) 310 and the object(s) 306, the mapper 312 can determine how much each portion, region, block, pixel, datapoint, and/or feature of the object(s) has moved from a time when the sensor data 302 including the object(s) 306 was captured to the reference time associated with the aligned object(s) 310.

For example, in some cases, the mapping 314 can indicate a change in position of each portion, region, block, pixel, datapoint, and/or feature of the aligned object(s) 310 relative to the object(s) 306. In other words, the mapping 314 can indicate a change in position of each portion, region, block, pixel, datapoint, and/or feature of the object(s) from a time when the sensor data 302 that includes the object(s) 306 was captured to the reference time associated with the aligned object(s) 310. The mapping 314 can thus be used to align the sensor data 302 (e.g., including other portions of the sensor data 302 in addition to the object(s) 306) to the reference time as further described below. In some cases, the mapping 314 can additionally indicate a change in position and/or magnitude change in position of each remaining portion, region, block, pixel, datapoint, and/or feature of the sensor data 302 (e.g., the remaining sensor data in addition to the object(s) 306) relative to a version of the same data when aligned to and/or after being aligned to the reference time.

In some cases, the mapping 314 can indicate a predicted trajectory of the sensor data 302 and/or the object(s) 306 from a time when the sensor data 302 was captured to the reference time associated with the aligned object(s) 310. The predicted trajectory can include, for example and without limitation, a predicted position at the reference time, a velocity, an acceleration, and/or any other motion information. The predicted trajectory indicated in the mapping 314 can be used to align the sensor data 302 to the reference time, as further described below.

In some examples, the mapper 312 can include a model or algorithm configured to determine a correspondence between portions, regions, blocks, pixels, datapoints, and/or features associated with an object (e.g., object(s) 306) and a version of the object aligned to a reference time (e.g., aligned object(s) 310). In some cases, the mapper 312 can include a model or algorithm configured to track portions, regions, blocks, pixels, datapoints, and/or features from an object to an aligned version of the object (e.g., object(s) 310).

After generating the mapping 314, the mapper 312 can provide the mapping 314 to a data alignment model 316 configured to apply the mapping 314 to the sensor data 302 to align the sensor data 302 to a reference time. Thus, the data alignment model 316 can use the mapping 314 to align the sensor data 302 to a reference time associated with the aligned object(s) 310. In some examples, the data alignment model 316 can use the mapping 314 to project the sensor data 302 to the reference time. For example, the data alignment model 316 can use a predicted trajectory indicated in and/or determined from the mapping 314 to project the sensor data 302 to the reference time associated with the aligned object(s) 310. In other words, the data alignment model 316 can use a predicted trajectory (e.g., a change in position, a predicted position, a velocity, acceleration, etc.) from the mapping 314 to project each portion, region, block, pixel, datapoint, and/or feature of the sensor data 302 to the reference time.

In another example, the data alignment model 316 can use the mapping 314 to determine a change in a position of corresponding portions, regions, blocks, pixels, datapoints, and/or features associated with the object(s) 306 and the aligned object(s) 310, and use the change in position to determine a change in position of other portions of the sensor data 302 from a time when the sensor data 302 was captured to the reference time. In some cases, the data alignment model 316 can apply a transform or a transform algorithm to the sensor data 302 to align the sensor data 302 to the reference time based on the mapping 314. In other cases, the data alignment model 316 can use a machine learning model, such as a neural network, to align the sensor data 302 to the reference time based on the mapping 314.

By applying the mapping 314 to the sensor data 302, the data alignment model 316 can generate aligned data 318. The aligned data 318 can include the sensor data 302 aligned to the reference time based on the mapping 314. For example, the aligned data 318 can include the sensor data 302 (e.g., the object(s) 306 or the aligned object(s) 310 and any other data in the sensor data 302) modified such that at least some of the sensor data 302 is aligned to (e.g., moved, repositioned, projected to, etc.) the reference time. The aligned data 318 can be fused with other sensor data from a different sensor that is also aligned to the same time as the aligned data 318 (e.g., to the reference time), as further described below.

In addition to the foregoing, the sensor system 106 can collect sensor data 322 and provide the sensor data 322 to a sensor model 324 configured to detect an object(s) in the sensor data 322. The sensor system 106 can include any sensor system such as, for example and without limitation, a RADAR sensor, a LIDAR sensor, a camera sensor, an ultrasonic sensor, a wireless sensor (e.g., a WIFI sensor, etc.), an IR sensor, a TOF sensor, or any other sensor. The sensor system 106 can include a same type or different type of sensor than the sensor system 104. The sensor data 322 can include data captured by the sensor system 106 such as, for example, image data (e.g., a still image, a video frame, etc.), a point cloud or point cloud data, one or more measurements, acoustic data, one or more frames, a sensor map (e.g., a depth map, a TOF sensor map, a heat map, etc.), an output signal (e.g., a RADAR signal, a distance or proximity sensor signal, etc.), a WIFI environment map (e.g., a WIFI heat map, etc.), a wave or pulse (e.g., a sound wave, etc.), a distance or proximity sensor output, an IR sensor output, or any other sensor output.

The sensor model 324 can process the sensor data 322 and detect an object(s) 326 in the sensor data 322 (e.g., depicted in the sensor data 322, measured in the sensor data 322, represented in the sensor data 322, captured in the sensor data 322, described in the sensor data 322, contained in the sensor data 322, reflected in the sensor data 322, etc.). For example, the sensor model 324 can process the sensor data 322 and identify a portion of the sensor data that corresponds to the object(s) 326 in the sensor data 322. In some cases, the sensor model 324 can perform segmentation to identify and/or distinguish between a portion(s) of the sensor data 322 corresponding to a background and a portion(s) of the sensor data 322 corresponding to the object(s) 326 and/or a foreground that includes the object(s) 326.

In some cases, the sensor model 324 can detect features in the sensor data 322 corresponding to the object(s) 326 and detect the object(s) 326 based on the detected features. The sensor model 324 can also optionally classify the features and/or the combination of features as corresponding to the object(s) 326 and/or the type of object(s) of the object(s) 326. In some cases, the sensor model 324 can generate a bounding box (or any other shape) identifying and/or outlining the region(s) and/or portion(s) of the sensor data 322 that includes the object(s) 326. If the sensor data 322 includes image data, in some examples, the sensor model 324 can perform image processing to detect the object(s) 326 within the image data.

The sensor model 324 can be configured to extract the object(s) 326 from the sensor data 322, determine and/or generate a bounding box over a portion of the sensor data 322 that includes the object(s) 326, classify a portion of the sensor data 322 (e.g., one or more pixels, one or more blocks, one or more values, one or more components, one or more features, one or more datapoints, etc.) as belonging and/or including the object(s) 326, determine one or more portions (e.g., one or more datapoints, one or more pixels, one or more features, one or more values, one or more blocks of data, one or more signal components, etc.) of the sensor data 322 corresponding to the object(s) 326, and/or otherwise detect the object(s) 326 in/from the sensor data 322.

The sensor model 324 can be the same as or different than the sensor model 304 or the sensor model 204 shown in FIG. 2. The sensor model 324 can include any model configured to detect one or more objects in the sensor data 322. In some cases, the sensor model 324 can be configured to process data specific to the type of sensor of the sensor system 106 and detect (e.g., identify, classify, extract, outline, map, segment, recognize, and/or determine) one or more objects in/from the data. In other cases, the sensor model 324 can be configured to process data from multiple types of sensors and detect (e.g., identify, classify, extract, outline, map, segment, recognize, and/or determine) the one or more objects in/from the data.

The sensor model 324 can provide the object(s) 326 detected in the sensor data 322 to a prediction extrapolator 328 configured to align and/or extrapolate the object(s) 326 to and/or based on a reference time. For example, the prediction extrapolator 328 can project the object(s) 326 to a reference time such that the object(s) 326 is aligned and/or repositioned to reflect a predicted position (e.g., location, orientation, etc.) of the object(s) 326 at the reference time. The prediction extrapolator 328 can generate an aligned object(s) 330 based on the object(s) 326 and a predicted trajectory (e.g., position, velocity, acceleration, etc.) of the object(s) 326. To generate the aligned object(s) 330, the prediction extrapolator 328 can project a position of the object(s) 326 to a predicted position where the object(s) 326 is predicted to be at a reference time. The aligned object(s) 330 can thus reflect the predicted position of the object(s) 326 at the reference time.

The prediction extrapolator 328 can be the same as or different than the prediction extrapolator 308 or the prediction extrapolator 208 shown in FIG. 2. The prediction extrapolator 328 can include a model(s) and/or algorithm configured to receive one or more input objects and align the one or more input objects based on a predicted trajectory (e.g., position, velocity, acceleration, etc.) of the one or more input objects. For example, the prediction extrapolator 328 can include a model(s) and/or algorithm configured to predict a trajectory of the object(s) 326 and modify a position of the object(s) 326 to reflect a predicted position of the object(s) 326 at the reference time, as previously explained.

In some examples, to generate the aligned object(s) 330, the prediction extrapolator 328 can determine a predicted trajectory of the object(s) 326 and reposition the object(s) 326 based on the predicted trajectory of the object(s) 326. For example, the prediction extrapolator 328 can determine the reference time to which the prediction extrapolator 328 will project the object(s), determine a predicted trajectory of the object(s) 326, and use the predicted trajectory to align the object(s) 326 according to the predicted position of the object(s) 326 at the reference time as determined based on the predicted trajectory of the object(s) 326 and the reference time relative to a time associated with the position of the object(s) reflected in the sensor data 322. The prediction extrapolator 328 can align the object(s) 326 by using the predicted trajectory to project the position of the object(s) 326 from a position of the object(s) 326 reflected in the sensor data 322 to a predicted position of the object(s) 326 at the reference time.

In some cases, to determine the predicted trajectory of the object(s) 326 used to align the object(s) 326 and generate the aligned object(s) 330, the prediction extrapolator 328 can analyze sensor data that includes the object(s) 326 at one or more times to determine motion and/or motion vectors associated with the object(s) 326. The motion and/or motion vectors can reflect motion of the object(s) 326 at the one or more times, which can be used to determine the predicted trajectory used to generate the aligned object(s) 330. The one or more times can include one or more previous times (e.g., relative to a time when the sensor data 322 was captured). In some cases, the one or more times can additionally include a time (e.g., a current time) when the sensor data 322 was captured (e.g., and thus the time associated with a position of the object(s) 326 in the sensor data 322). For example, the prediction extrapolator 328 can determine a motion or motion vectors of the object(s) 326 reflected in sensor data captured by the sensor system 106 at one or more previous times (and, in some cases, a time when the sensor data 322 was captured), such as previous frames captured by the sensor system 106 (and, in some cases, a frame associated with and/or corresponding to the sensor data 322). The motion and/or motion vectors can be used to determine the predicted trajectory used to generate the aligned object(s) 330.

For example, the motion and/or motion vectors can be used to determine a displacement or magnitude of displacement of the object(s) from a position of the object(s) reflected in the sensor data 322 to a predicted position of the object(s) 326 at the reference time. In some examples, the prediction extrapolator 328 can determine a magnitude of change in a trajectory of the object(s) 326 (e.g., a magnitude of change in a position, velocity, speed, and/or acceleration of the object(s) 326), and generate the aligned object(s) 330 by projecting a position of the object(s) 326 to the reference time based on the magnitude of change in the trajectory of the object(s) 326 and a difference (if any) between the time associated with the position of the object(s) 326 reflected in the sensor data 322 and the reference time.

In some cases, the prediction extrapolator 328 can implement a motion estimation algorithm to determine the motion and/or motion vectors associated with the object(s) 326 and/or the predicted trajectory associated with the object(s) 326. In some examples, the prediction extrapolator 328 can implement a translational motion model to predict a trajectory of the object(s) 326. The translational motion model can indicate, for example, the position of the object(s) 326 in previously captured sensor data (e.g., the sensor data 322 and/or other sensor data previously captured) by a motion vector (Δx, Δy), with Δx specifying the horizontal displacement (if any) of the object(s) 326 and Δy specifying the vertical displacement (if any) of the object(s) 326 relative to the position of the object(s) 326 in the sensor data 322 and/or the position of the object(s) 326 at the reference time.

In some examples, the prediction extrapolator 328 can additionally or alternatively include an optical flow algorithm, a Harris corner detection algorithm, a dense motion map estimation algorithm, a semi-global matching algorithm, a computer vision algorithm, and/or any motion estimation and/or trajectory prediction algorithm. For example, the prediction extrapolator 328 can include an optical flow algorithm configured to determine motion information for the object(s) 326 based on a pattern of apparent motion of the object(s) caused by the relative motion between the sensor system 106 and a scene (and/or the object(s) 326) associated with the object(s) 326, and/or a distribution of apparent positions, velocities of movement, and/or acceleration of one or more portions of sensor data, such as a region associated with the object(s) 326 and/or a pattern associated with the object(s) 326. In some examples, the motion information and/or a magnitude of motion associated with the motion information can represent or can be used to determine the predicted trajectory of the object(s) used to align the object(s) 326.

In some cases, the predicted trajectory of the object(s) 326 can include a predicted position of the object(s) 326, a velocity of the object(s) 326, an acceleration of the object(s) 326, and/or any other motion information associated with the object(s) 326. Moreover, the predicted trajectory of the object(s) 326 can include motion information for forward and/or backward prediction directions, which can depend on the reference time relative to a time associated with the sensor data 322 (e.g., a future time or a previous time). For example, the reference time can include a future time and the predicted trajectory can include motion information for a forward prediction direction. In some illustrative aspects, the term "forward" in the forward prediction direction can have a geometrical meaning (e.g., a future position, a current position relative to a previous position, etc.), a meaning in terms of time (e.g., a future time, a current time relative to a previous time associated with the object(s) 326 and/or sensor data used to determine the predicted trajectory, etc.), and/or a meaning in terms of predicted data and/or a predicted object(s) associated with the predicted trajectory, such as a future or forward frame (or any other future or forward sensor data), a current frame (or any other current sensor data), etc.

After generating the aligned object(s) 330, the prediction extrapolator 328 can provide the aligned object(s) 330 to a mapper 332 configured to use the aligned object(s) 330 to generate a mapping 334 that maps portions, regions, blocks, pixels, datapoints, and/or features of the aligned object(s) 330 to corresponding portions, regions, blocks, pixels, datapoints, and/or features of the object(s) 326. For example, the mapper 332 can compare the aligned object(s) 330 with the object(s) 326 to determine a correspondence between portions, regions, blocks, pixels, datapoints, and/or features of the aligned object(s) 330 and the object(s) 326. To illustrate, the mapper 332 can identify, for each pixel or datapoint of the aligned object(s) 330, which pixel or datapoint of the object(s) 326 matches and/or corresponds to that pixel or datapoint of the aligned object(s) 330.

In some cases, the mapping 334 can map portions, regions, blocks, pixels, datapoints, and/or features of the object(s) 326 to corresponding portions, regions, blocks, pixels, datapoints, and/or features of the aligned object(s) 330. Each corresponding portion, region, block, pixel, datapoint, and/or feature of the aligned object(s) can be or represent a particular (e.g., a matching, etc.) portion, region, block, pixel, datapoint, and/or feature of the object(s) 326. For example, a datapoint in the aligned object(s) 330 corresponding to a datapoint in the object(s) 326 can be the datapoint in the object(s) 326 as contained in the aligned object(s) 330 (e.g., can be the same datapoint after the datapoint is aligned and/or projected to the reference time associated with the aligned object(s) 330).

In some aspects, the mapping 334 can map portions, regions, blocks, pixels, datapoints, and/or features of the object(s) 326 to corresponding portions, regions, blocks, pixels, datapoints, and/or features of the aligned object(s) 330 as previously described. In other aspects, the mapping 334 can additionally map other portions, regions, blocks, pixels, datapoints, and/or features of the sensor data 322 (e.g., other portions, regions, blocks, pixels, datapoints, and/or features that do not include or correspond to the object(s) 326) to other corresponding portions, regions, blocks, pixels, datapoints, and/or features of the sensor data aligned and/or projected to the reference time associated with the aligned object(s) 330. In some examples, by identifying a correspondence between portions, regions, blocks, pixels, datapoints, and/or features of the aligned object(s) 330 and the object(s) 326, the mapper 332 can determine how much each portion, region, block, pixel, datapoint, and/or feature of the object(s) has moved from a time when the sensor data 322 including the object(s) 326 was captured to the reference time associated with the aligned object(s) 330.

For example, in some cases, the mapping 334 can indicate a change in position of each portion, region, block, pixel, datapoint, and/or feature of the aligned object(s) 330 relative to the object(s) 326. In other words, the mapping 334 can indicate a change in position of each portion, region, block, pixel, datapoint, and/or feature of the object(s) from a time when the sensor data 322 that includes the object(s) 326 was captured to the reference time associated with the aligned object(s) 330. The mapping 334 can thus be used to align the sensor data 322 (e.g., including other portions of the sensor data 322 in addition to the object(s) 326) to the reference time as further described below. In some cases, the mapping 334 can additionally indicate a change in position and/or a magnitude change in position of each remaining portion, region, block, pixel, datapoint, and/or feature of the sensor data 322 (e.g., the remaining sensor data in addition to the object(s) 326) relative to a version of the same data when aligned to and/or after being aligned to the reference time.

In some cases, the mapping 334 can indicate a predicted trajectory of the sensor data 322 and/or the object(s) 326 from a time when the sensor data 322 was captured to the reference time associated with the aligned object(s) 330. The predicted trajectory can include, for example and without limitation, a predicted position at the reference time, a velocity, an acceleration, and/or any other motion information. The predicted trajectory indicated in the mapping 334 can be used to align the sensor data 322 to the reference time, as further described below.

In some examples, the mapper 332 can include a model or algorithm configured to determine a correspondence between portions, regions, blocks, pixels, datapoints, and/or features associated with an object (e.g., object(s) 326) and a version of the object aligned to a reference time (e.g., aligned object(s) 330). In some cases, the mapper 332 can include a model or algorithm configured to track portions, regions, blocks, pixels, datapoints, and/or features from an object to an aligned version of the object (e.g., object(s) 310). The mapper 332 can be the same or a different mapper than the mapper 312. Moreover, the mapper 332 can be a same type or different type of mapper than the mapper 312.

After generating the mapping 334, the mapper 332 can provide the mapping 334 to a data alignment model 336 configured to apply the mapping 334 to the sensor data 322 to align the sensor data 322 to a reference time. Thus, the data alignment model 336 can use the mapping 334 to align the sensor data 322 to a reference time associated with the aligned object(s) 330. In some examples, the data alignment model 336 can use the mapping 334 to project the sensor data 322 to the reference time. For example, the data alignment model 336 can use a predicted trajectory indicated in and/or determined from the mapping 334 to project the sensor data 322 to the reference time associated with the aligned object(s) 330. In other words, the data alignment model 336 can use a predicted trajectory (e.g., a change in position, a predicted position, a velocity, acceleration, etc.) from the mapping 334 to project each portion, region, block, pixel, datapoint, and/or feature of the sensor data 322 to the reference time.

In another example, the data alignment model 336 can use the mapping 334 to determine a change in a position of corresponding portions, regions, blocks, pixels, datapoints, and/or features associated with the object(s) 326 and the aligned object(s) 330, and use the change in position to determine a change in position of other portions of the sensor data 322 from a time when the sensor data 322 was captured to the reference time. In some cases, the data alignment model 336 can apply a transform or a transform algorithm to the sensor data 322 to align the sensor data 322 to the reference time based on the mapping 334. In other cases, the data alignment model 336 can use a machine learning model, such as a neural network, to align the sensor data 322 to the reference time based on the mapping 334.

By applying the mapping 334 to the sensor data 322, the data alignment model 336 can generate aligned data 338. The aligned data 338 can include the sensor data 322 aligned to the reference time based on the mapping 334. For example, the aligned data 338 can include the sensor data 322 (e.g., the object(s) 326 or the aligned object(s) 330 and any other data in the sensor data 322) modified such that at least some of the sensor data 322 is aligned to (e.g., moved, repositioned, projected to, etc.) the reference time.

The aligned data 338 can be fused with the aligned data 318, as both the aligned data 318 and the aligned data 338 are aligned to the reference time. In some examples, a fusion model 340 can receive the aligned data 318 from the data alignment model 316 and the aligned data 338 from the data alignment model 336 and fuse the aligned data 318 and the aligned data 338 to generate fused data 342. This way, the fusion model 340 can align data from obtained from different sensors and aligned to a common time (e.g., sensor data 302 from sensor system 104 after being aligned to the reference time and sensor data 322 from sensor system 106 after being aligned to the reference time).

The fused data 342 can include at least some of the aligned data 318 and at least some of the aligned data 338. The fusion model 340 can generate the fused data 342 by merging or combining the aligned data 318 and the aligned data 338. Merging of the aligned data 318 and 338 may include a concatenation, sum, mean, min or max operation. In some cases, the fusion model 340 can determine a correspondence or mapping between pixels, datapoints, regions, values, and/or portions corresponding to the aligned data 318 and the aligned data 338, and blend, merge, or combine the corresponding or mapped pixels, datapoint, regions, values, and/or portions of the aligned data 318 and the aligned data 338.

The fusion model 340 can provide the fused data 342 to a processing algorithm(s) 344 configured to use the fused data 342 to perform a calculation, generate data, perform an action, and/or otherwise generate an output and/or result. For example, in some cases, the processing algorithm(s) 344 can represent one or more prediction and/or planning algorithms used by an AV (e.g., AV 102) to perform one or more AV prediction and/or planning tasks, operations, calculations, etc. In this example, the fusion model 340 can provide the fused data 342 to the processing algorithm(s) 344 to use the fused data 342 to perform the one or more AV prediction and/or planning tasks, operations, calculations, etc. In some examples, the fused data 342 and/or information/insights provided by the fused data 342 can be more robust, detailed, descriptive, accurate, and/or reliable than the sensor data 302 or the sensor data 322.

In some cases, the processing algorithm(s) 344 can be the same or a same type as the processing algorithm(s) 234 shown in FIG. 2. In other cases, the processing algorithm(s) 344 can be different than or a different type than the processing algorithm(s) 234 shown in FIG. 2.

When fusing sensor data from different sensors or objects in sensor data from different sensors, the systems and techniques described herein can align the sensor data or the objects to a reference time (e.g., a common time) so that all the data being fused corresponds to the same time and reflect the state of such data at the same time. In some cases, the reference time can be a common future time relative to the time when the sensor data from the different sensors was captured. In other cases, the reference time can be the same time as the time when the sensor data from one of the different sensors was captured.

Figure 4A:
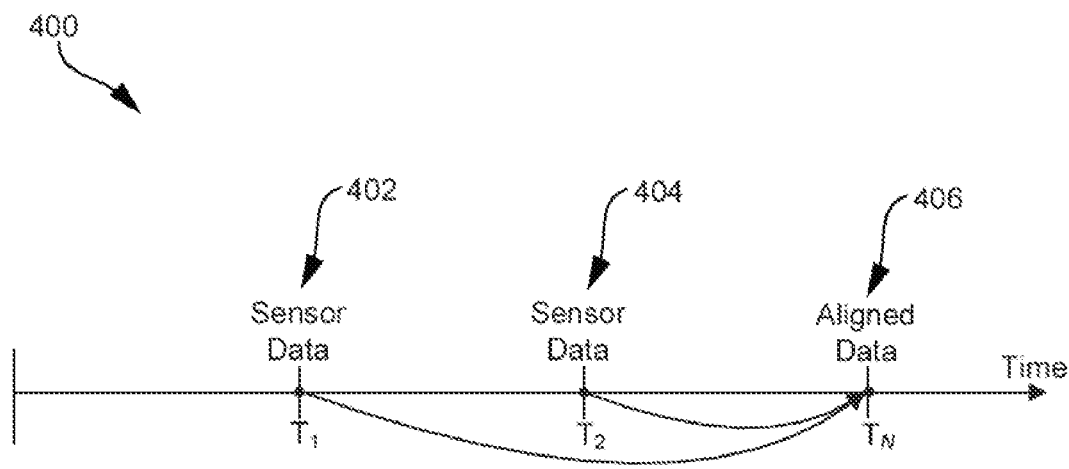
FIG. 4A illustrates an example timeline showing an example reference time for aligning sensor data from different sensors, according to some examples of the present disclosure.

FIG. 4A illustrates an example timeline 400 showing an example reference time for aligning sensor data from different sensors. As shown, the sensor data 402 in the timeline 400 was captured at time $t_1$ and the sensor data 404 in the timeline 400 was captured at time $t_2$, which is after time $t_1$. In this example, the sensor data 402 can represent data from a particular sensor and the sensor data 404 can represent data from a different sensor (e.g., of a same type or a different type).

The sensor data 402 and the sensor data 404 are used to generate aligned data 406. In this example, the aligned data 406 includes data aligned to the reference time $t_n$, which is after time $t_1$ and time $t_2$. The aligned data 406 can be generated by aligning the sensor data 402 and the sensor data 404 to the reference time $t_n$ and fusing both sets of aligned data (e.g., the sensor data 402 aligned to the reference time $t_n$ and the sensor data 404 aligned to the reference time $t_n$).

Figure 4B:
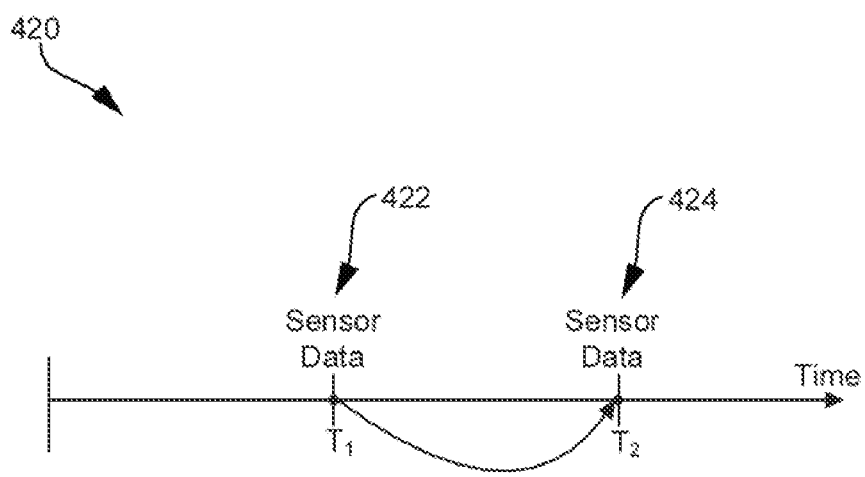
FIG. 4B illustrates another example timeline for aligning sensor data from different sensors, according to some examples of the present disclosure.

FIG. 4B illustrates another example timeline 420 for aligning sensor data from different sensors. As shown, the sensor data 422 in the timeline 420 was captured at time $t_1$ and the sensor data 424 in the timeline 420 was captured at time $t_2$, which is after time $t_1$. In this example, the sensor data 422 can represent data from a particular sensor and the sensor data 424 can represent data from a different sensor (e.g., of a same type or a different type).

In this example, the sensor data 422 is aligned to the time $t_2$ associated with the sensor data 424. Thus, rather than aligning the sensor data 422 and the sensor data 424 to a reference time $t_n$ that is after the time $t_1$ associated with the sensor data 422 and the time $t_2$ associated with the sensor data 424, in this example timeline 420 both sets of data (e.g., the sensor data 420 and the sensor data 424) can be aligned to a common time by aligning the sensor data 422 to the time $t_2$ of the sensor data 424. For example, the sensor data 422 can be projected from the time $t_1$ to the time $t_2$ associated with the sensor data 424. Once the sensor data 422 is aligned to the time $t_2$ associated with the sensor data 424, the sensor data 424 and the aligned version of the sensor data 422 can be fused as previously described, as both sets of sensor data are aligned to a common time (e.g., time $t_2$).

Figure 4C:
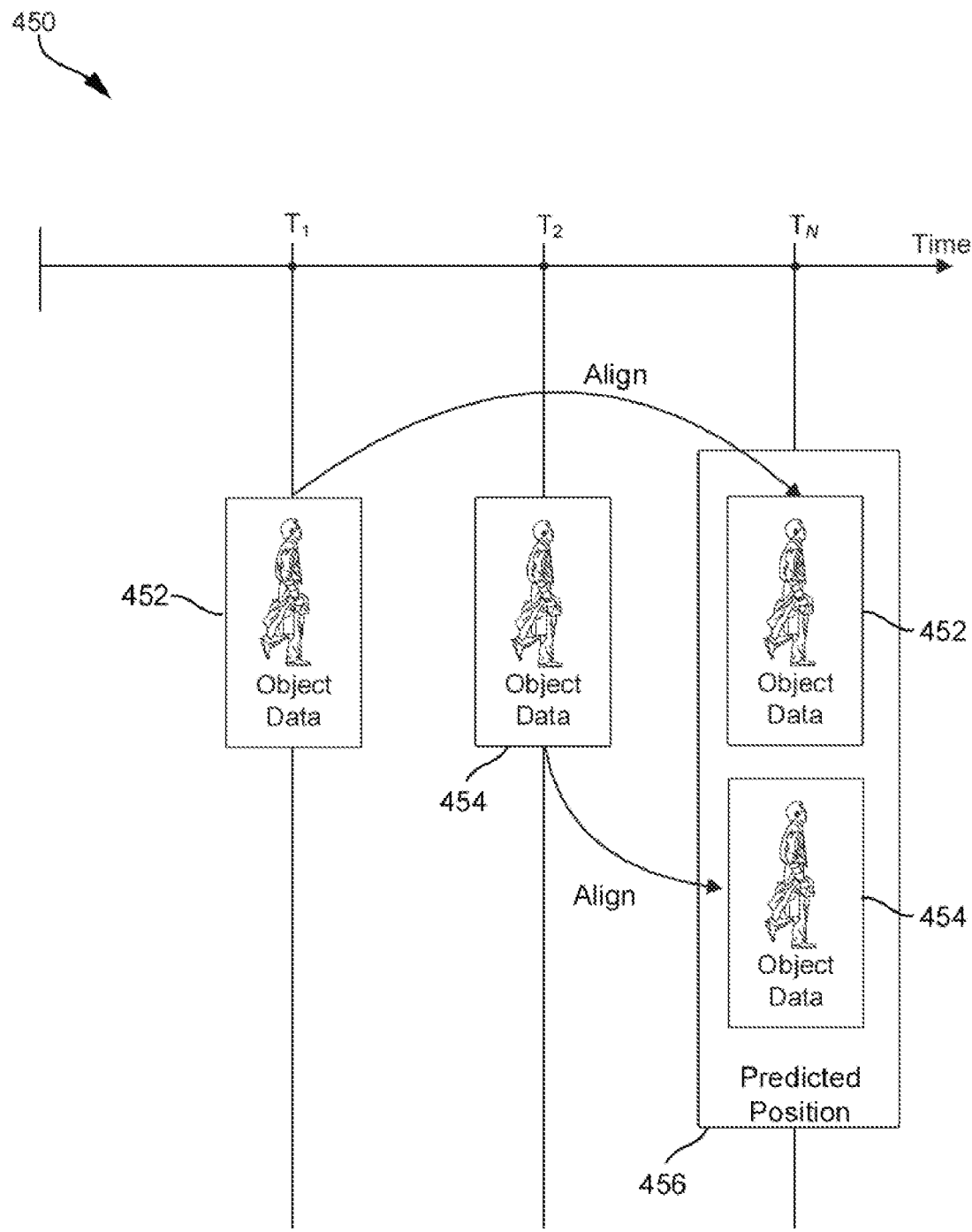
FIG. 4C is a diagram illustrating another example timeline for aligning object data from different sensors, according to some examples of the present disclosure.

FIG. 4C is a diagram illustrating another example timeline 450 for aligning object data from different sensors. In this example, a first sensor captured object data 452 at a time $t_1$, and a second sensor captured object data 454 at a time $t_2$ after the time $t_1$. The first sensor and the second sensor can represent same or different type of sensors. For example, in some cases, the first sensor can include a LIDAR and the second sensor can include a RADAR or a camera sensor. In another example, both the first sensor and the second sensor can include a same type of sensor such as, for example, a LIDAR, a RADAR, a camera sensor, an ultrasonic sensor, an IR sensor, or any other type of sensor.

The object data 452 can represent, depict, measure, describe, and/or include the same object as the object data 454. In this example, the object data 452 and the object data 454 both correspond to a pedestrian. However, in other examples, the object data 452 and the object data 454 can both correspond to one or more other objects (e.g., in addition to the pedestrian or instead of the pedestrian) such as, for example and without limitation, another pedestrian, a vehicle, a sign, a tree, a building, an animal, a device, a bicycle, a motorcycle, another moving vehicle, a structure, a cone, or any other object. The object data 452 in FIG. 4C provides a visual representation of the sensor data associated with the object (e.g., the pedestrian) captured by the first sensor, and the object data 454 in FIG. 4C provides a visual representation of the sensor data associated with the object (e.g., the pedestrian) captured by the second sensor. However, while in some examples the object data 452 and/or the object data 454 can include visual or image data (e.g., frames, pixel values, etc.), in other examples, the object data 452 and/or the object data 454 can include other type of data such as, for example, a point cloud, RADAR data, ultrasonic sensor data, IR sensor data, values and/or measurements, or any other type of sensor data.

As shown, the object data 452 and the object data 454 are not temporally aligned as the object data 452 reflects the pedestrian at time $t_1$ and the object data 454 reflects the pedestrian at time $t_2$. Such temporal misalignment can also cause a spatial misalignment of the pedestrian in the object data 452 and the object data 454. For example, if the pedestrian moved after time $t_1$, the pedestrian will be at a different position in space at time $t_2$ and thus will be spatially misaligned in the object data 454 relative to the object data 452.

To align the object data 452 and the object data 454 (and thus the pedestrian in the object data 452 and the object data 454), the systems and techniques described herein can align both the object data 452 (e.g., and/or the pedestrian in the object data 452) and the object data 454 (and/or the pedestrian in the object data 454) to a common/same time, which in this example is time $t_n$. For example, the systems and techniques described herein can calculate a predicted trajectory of the pedestrian in the object data 452 and object data 454 and use the predicted trajectory to project/reposition the pedestrian in the object data 452 from the pedestrian's position at time $t_1$ to the pedestrian's predicted position 456 at time $t_n$, and project/reposition the pedestrian in the object data 454 from the pedestrian's position at time $t_2$ to the pedestrian's predicted position 456 at time $t_n$. This way, the pedestrian in the object data 452 and object data 454 aligned to time $t_n$ can reflect a same position in space (e.g., predicted position 456) and time (e.g., time $t_n$).

The predicted position 456 can include or represent a same position or similar position in space, such as a same position along X, Y, and Z dimensions and/or a same position relative to an object such as an AV implementing the first sensor and the second sensor. Thus, by aligning the object data 452 and the object data 545 in time (e.g., time $t_n$), the pedestrian in the object data 452 and the object data 454 can be repositioned in space such that the predicted position of the pedestrian in the object data 452 and 454 can overlap. However, for clarity, in FIG. 4C, the pedestrian in the object data 452 and the object data 454 is not depicted as overlapping in space.

By aligning the object data 452 and the object data 454 in time, the systems and techniques described herein can fuse the object data 452 and the object data 454 and prevent or minimize errors, failures, and/or issues that could potentially be caused by otherwise having the object data 452 and the object data 454 temporally misaligned and/or the pedestrian associated with the object data 452 and the object data 454 temporally and/or spatially misaligned. In some examples, the predicted trajectory used to align the object data 452 to time $t_n$ can include a predicted position of the pedestrian, a velocity of the pedestrian, and/or an acceleration of the pedestrian. Similarly, the predicted trajectory used to align the object data 454 to time $t_n$ can include a predicted position of the pedestrian, a velocity of the pedestrian, and/or an acceleration of the pedestrian.

In some cases, to align the object data 452 to time $t_n$, the systems and techniques described herein can calculate a change in the position of the object data 452 from the time $t_1$ to the time $t_n$, to align the object data 454 to time $t_n$, the systems and techniques described herein can calculate a change in the position of the object data 454 from the time $t_2$ to the time $t_n$. In some examples, the systems and techniques described herein can determine a motion and/or a magnitude of a change in position, velocity, and/or acceleration associated with the object data 452 and determine the predicted position of the object data 452 based on the difference between the time $t_1$ associated with the object data 452 and the time $t_n$ and the motion and/or the magnitude of the change in position, velocity, and/or acceleration associated with the object data 452. Similarly, in some examples, the systems and techniques described herein can determine a motion and/or a magnitude of a change in position, velocity, and/or acceleration associated with the object data 454 and determine the predicted position of the object data 454 based on the difference between the time $t_2$ associated with the object data 454 and the time $t_n$ and the motion and/or the magnitude of the change in position, velocity, and/or acceleration associated with the object data 454.

Figure 5:
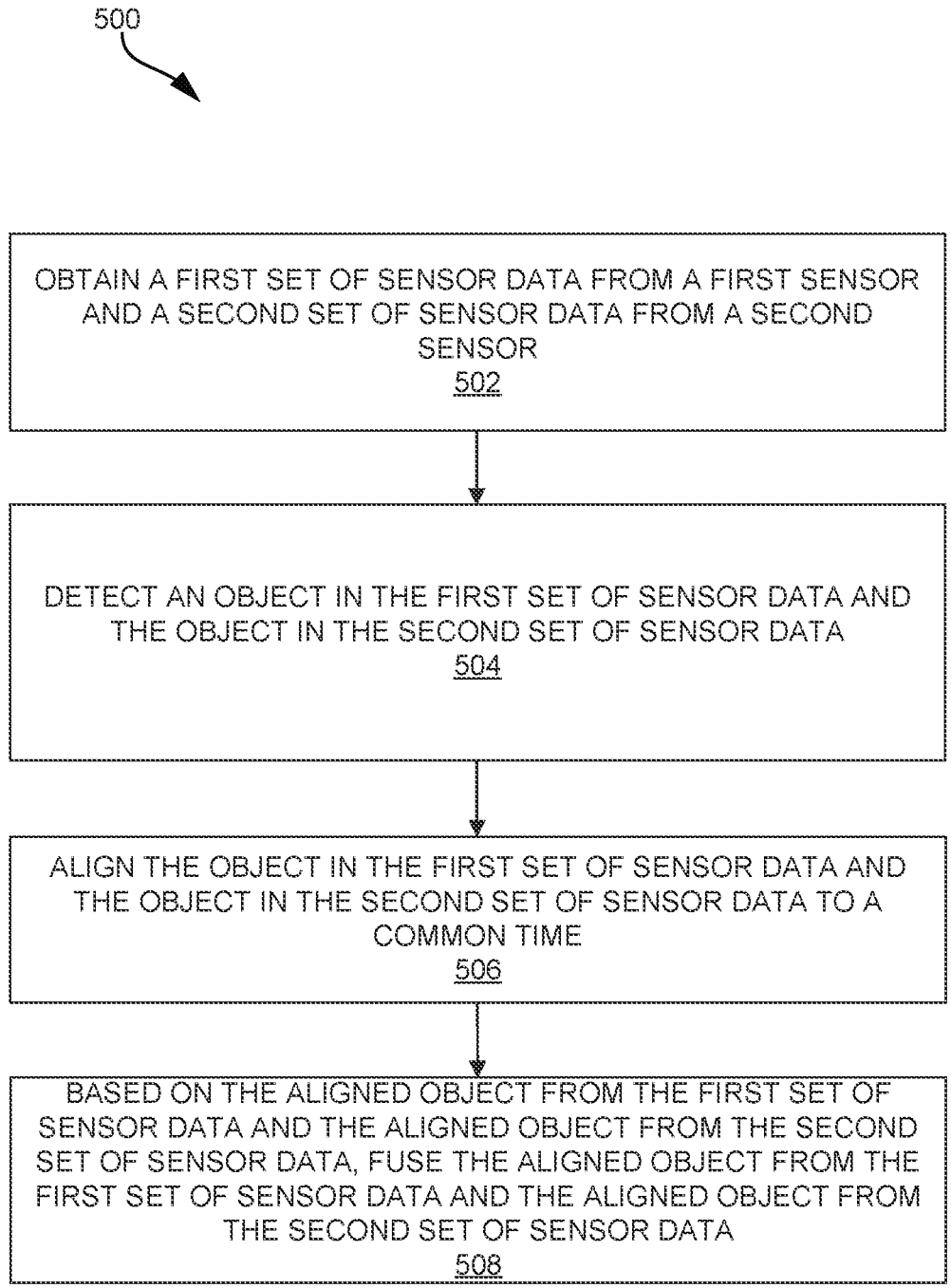
FIG. 5 is a flowchart illustrating an example processing for fusing sensor data from multiple sensors, according to some examples of the present disclosure.

FIG. 5 is a flowchart illustrating an example processing for fusing sensor data from multiple sensors. At block 502, the process 500 can include obtaining a first set of sensor data (e.g., sensor data 202) from a first sensor (e.g., sensor system 104) and a second set of sensor data (e.g., sensor data 212) from a second sensor (e.g., sensor system 106). The first set of sensor data and/or the second set of sensor data can include, for example, RADAR data, LIDAR data, image data, soundwaves, IR data, measurements, one or more frames, and/or any other data. In some cases, the first sensor and/or the second sensor can include a LIDAR, a RADAR, a camera sensor, an ultrasonic sensor, and/or an IR sensor.

In some cases, the first sensor and the second sensor can include sensors mounted on an AV. In such cases, the first set of sensor data and the second set of sensor data can include sensor data captured by the first sensor and the second sensor of a scene(s) around the AV while the AV navigates in the scene(s).

At block 504, the process 500 can include detecting an object (e.g., object(s) 206) in the first set of sensor data and the object (e.g., object(s) 216) in the second set of sensor data. For example, the process 500 can implement an object detection algorithm(s) to detect the object in the first set of sensor data and the second set of sensor data.

The object and the first set of sensor data and the object in the second set of sensor data can be and/or represent a same object. The object can include, for example and without limitation, a vehicle, a pedestrian, a traffic sign, a tree, a building, an animal, a bicycle, a motorcycle, a road, an intersection, a crosswalk, a sidewalk, a structure, a cone, a scene element, a road or lane marking, and/or any other object.

At block 506, the process 500 can include aligning the object in the first set of sensor data and the object in the second set of sensor data to a common time. In some cases, fusing the aligned object from the first set of sensor data and the aligned object from the second set of sensor data can include combining or merging the aligned object from the first set of sensor data and the aligned object from the second set of sensor data.

In some examples, the common time can include a future time relative to a first time when the first set of sensor data was captured and/or a second time when the second set of sensor data was captured. In other examples, the common time can include a first time when the first set of sensor data was captured or a second time when the second set of sensor data was captured.

In some aspects, aligning the object in the first set of sensor data and the object in the second set of sensor data to the common time can include determining a first predicted trajectory of the object in the first set of sensor data; determining a second predicted trajectory of the object in the second set of sensor data; aligning the object in the first set of sensor data to the common time based on the first predicted trajectory; and aligning the object in the second set of sensor data to the common time based on the second predicted trajectory.

In some examples, aligning the object in the first set of sensor data to the common time can include projecting, based on the first predicted trajectory, the object from a time when the first set of sensor data was captured to the common time. In other examples, aligning the object in the second set of sensor data to the common time can additionally or alternatively include projecting, based on the second predicted trajectory, the object from a time when the second set of sensor data was captured to the common time.

In some aspects, the first predicted trajectory can include a first predicted location of the object in the first set of sensor data at the common time, a first velocity of the object in the first set of sensor data, and/or a first acceleration of the object in the first set of sensor data. In some aspects, the second predicted trajectory can include a second predicted location of the object in the second set of sensor data at the common time, a second velocity of the object in the second set of sensor data, and/or a second acceleration of the object in the second set of sensor data.

In some cases, determining the first predicted trajectory of the object in the first set of sensor data can include determining, based on the first set of sensor data and/or previous sensor data relative to the first set of sensor data, one or more motion vectors indicating a first motion of the object in the first set of sensor data. In other cases, determining the second predicted trajectory of the object in the second set of sensor data can additionally or alternatively include determining, based on the second set of sensor data and/or previous sensor data relative to the second set of sensor data, one or more additional motion vectors indicating a second motion of the object in the second set of sensor data.

At block 508, the process 500 can include based on the aligned object from the first set of sensor data and the aligned object from the second set of sensor data, fusing the aligned object from the first set of sensor data and the aligned object from the second set of sensor data. In some examples, fusing the aligned object from the first and second sets of sensor data can include merging and/or combining the aligned objects from the first and second sets of sensor data. In some aspects, the process 500 can further include generating a fused object based on the fusing of the aligned objects from the first and second sets of sensor data, and processing the fused object using one or more algorithms. In some cases, the one or more algorithms can include a prediction algorithm of a prediction stack of an AV and/or a planning algorithm of a planning stack of the AV.

In some examples, aligning the object in the first set of sensor data and the object in the second set of sensor data to the common time can include aligning the object in the first set of sensor data and the object in the second set of sensor data to the common time using a prediction model (e.g., prediction extrapolator 208, prediction extrapolator 218, prediction extrapolator 308, prediction extrapolator 328). In some aspects, the process 500 can further include using the prediction model or a different prediction model to perform track a state of the aligned object from the first set of sensor data and the aligned object from the second set of sensor data and/or generate, based on sensor data including the first set of sensor data and/or the second set of sensor data, planning data. In some examples, the planning data can include a first instruction for performing an autonomous maneuver by an autonomous vehicle (AV), a second instruction for performing one or more mechanical operations by the AV, and/or one or more parameters for performing the autonomous maneuver and/or one or more AV operations. In some cases, the state of the aligned object from the first set of sensor data and the object from the second set of sensor data can include an object location, an object orientation, an object motion, an object trajectory, and/or an object status.

Figure 6:
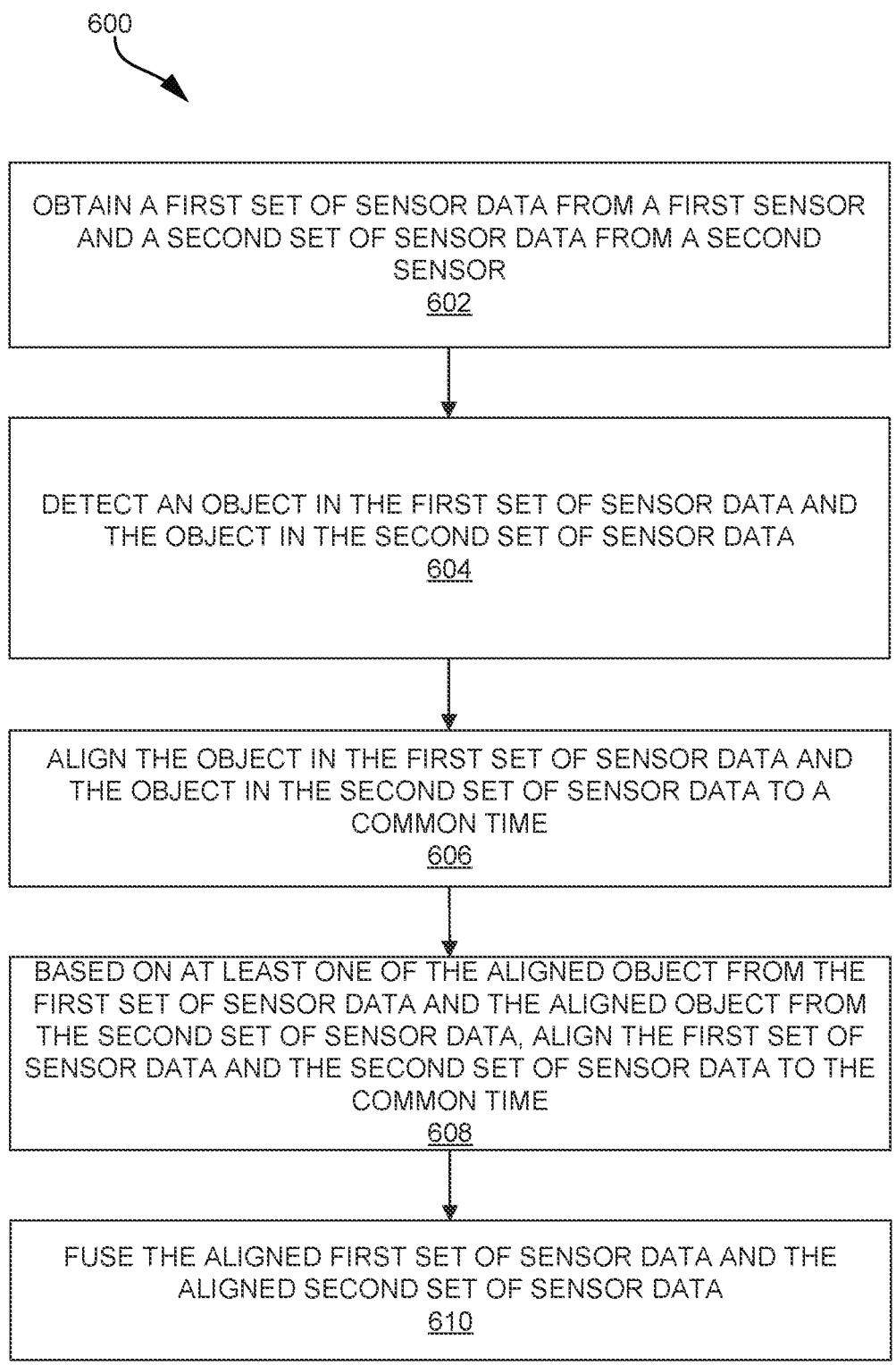
FIG. 6 is a flowchart illustrating another example processing for fusing sensor data from multiple sensors, according to some examples of the present disclosure.

FIG. 6 is a flowchart illustrating another example processing for fusing sensor data from multiple sensors. At block 602, the process 600 can include obtaining a first set of sensor data (e.g., sensor data 302) from a first sensor (e.g., sensor system 104) and a second set of sensor data (e.g., sensor data 322) from a second sensor (e.g., sensor system 106). The first set of sensor data and/or the second set of sensor data can include, for example, RADAR data, LIDAR data, image data, soundwaves, IR data, measurements, one or more frames, and/or any other data. In some cases, the first sensor and/or the second sensor can include a LIDAR, a RADAR, a camera sensor, an ultrasonic sensor, and/or an IR sensor.

In some cases, the first sensor and the second sensor can include sensors mounted on an AV. In such cases, the first set of sensor data and the second set of sensor data can include sensor data captured by the first sensor and the second sensor of a scene(s) around the AV while the AV navigates in the scene(s).

At block 604, the process 600 can include detecting an object in the first set of sensor data and the object in the second set of sensor data. For example, the process 600 can implement an object detection algorithm(s) to detect the object in the first set of sensor data and the second set of sensor data.

The object and the first set of sensor data and the object in the second set of sensor data can be and/or represent a same object. The object can include, for example and without limitation, a vehicle, a pedestrian, a traffic sign, a tree, a building, an animal, a bicycle, a motorcycle, a road, an intersection, a crosswalk, a sidewalk, a structure, a cone, a scene element, a road or lane marking, and/or any other object.

At block 606, the process 600 can include aligning the object in the first set of sensor data and the object in the second set of sensor data to a common time. In some cases, the common time can include a future time relative to a first time when the first set of sensor data was captured and/or a second time when the second set of sensor data was captured. In other cases, the common time can include a first time when the first set of sensor data was captured or a second time when the second set of sensor data was captured.

In some examples, aligning the object in the first set of sensor data and the object in the second set of sensor data to the common time can include determining a first predicted trajectory of the object in the first set of sensor data; determining a second predicted trajectory of the object in the second set of sensor data; aligning the object in the first set of sensor data to the common time based on the first predicted trajectory; and aligning the object in the second set of sensor data to the common time based on the second predicted trajectory.

In some cases, aligning the object in the first set of sensor data to the common time can include projecting, based on the first predicted trajectory, the object from a time when the first set of sensor data was captured to the common time. In some cases, aligning the object in the second set of sensor data to the common time can additionally or alternatively include projecting, based on the second predicted trajectory, the object from a time when the second set of sensor data was captured to the common time.

In some examples, the first predicted trajectory can include a first predicted location of the object in the first set of sensor data at the common time, a first velocity of the object in the first set of sensor data, and/or a first acceleration of the object in the first set of sensor data. In some examples, the second predicted trajectory can include a second predicted location of the object in the second set of sensor data at the common time, a second velocity of the object in the second set of sensor data, and/or a second acceleration of the object in the second set of sensor data.

At block 608, the process 600 can include, based on at least one of the aligned object from the first set of sensor data and the aligned object from the second set of sensor data, aligning the first set of sensor data and the second set of sensor data to the common time.

In some examples, aligning the first set of sensor data and the second set of sensor data to the common time further can include determining a first mapping between the object in the first set of sensor data and the aligned object from the first set of sensor data; determining a second mapping between the object in the second set of sensor data and the aligned object from the second set of sensor data; aligning the first set of sensor data based on the first mapping; and aligning the second set of sensor data to the common time based on the second mapping.

In some cases, aligning the first set of sensor data based on the first mapping can include based on a predicted trajectory of the object in the first mapping and/or a change in positions of the object and the aligned object indicated in the first mapping, repositioning features of the first set of sensor data from respective positions of the features at a time when the first set of sensor data was captured to predicted positions of the features at the common time. In some cases, aligning the second set of sensor data based on the second mapping can include based on at least one of a predicted trajectory of the object in the second mapping and a change in positions of the object and the aligned object indicated in the second mapping, repositioning features of the second set of sensor data from respective positions of the features at a time when the second set of sensor data was captured to predicted positions of the features at the common time.

At block 610, the process 600 can include fusing the aligned first set of sensor data and the aligned second set of sensor data. In some examples, fusing the aligned first set of sensor data and the aligned second set of sensor data can include combining or merging the aligned first set of sensor data and the aligned second set of sensor data.

In some aspects, the process 600 can further include generating fused data based on the fusing of the aligned first set of sensor data and the aligned second set of sensor data. In some cases, the process 600 can further include processing the fused object using one or more algorithms. In some cases, the one or more algorithms can include a prediction algorithm of a prediction stack of an AV and/or a planning algorithm of a planning stack of the AV.

In some aspects, aligning the object in the first set of sensor data and the object in the second set of sensor data to the common time comprises aligning the object in the first set of sensor data and the object in the second set of sensor data to the common time using a prediction model (e.g., prediction extrapolator 208, prediction extrapolator 218, prediction extrapolator 308, prediction extrapolator 328). In some aspects, the process 600 can include using the prediction model or a different prediction model to perform at least one of tracking a state of the aligned object from the first set of sensor data and the aligned object from the second set of sensor data and generating, based on sensor data comprising at least one of the first set of sensor data, the second set of sensor data, and the fused aligned first set of sensor data and the aligned second set of sensor data, planning data comprising at least one of a first instruction for performing an autonomous maneuver by an autonomous vehicle (AV), a second instruction for performing one or more mechanical operations by the AV, and one or more parameters for performing at least one of the autonomous maneuver and one or more AV operations.

Figure 7:
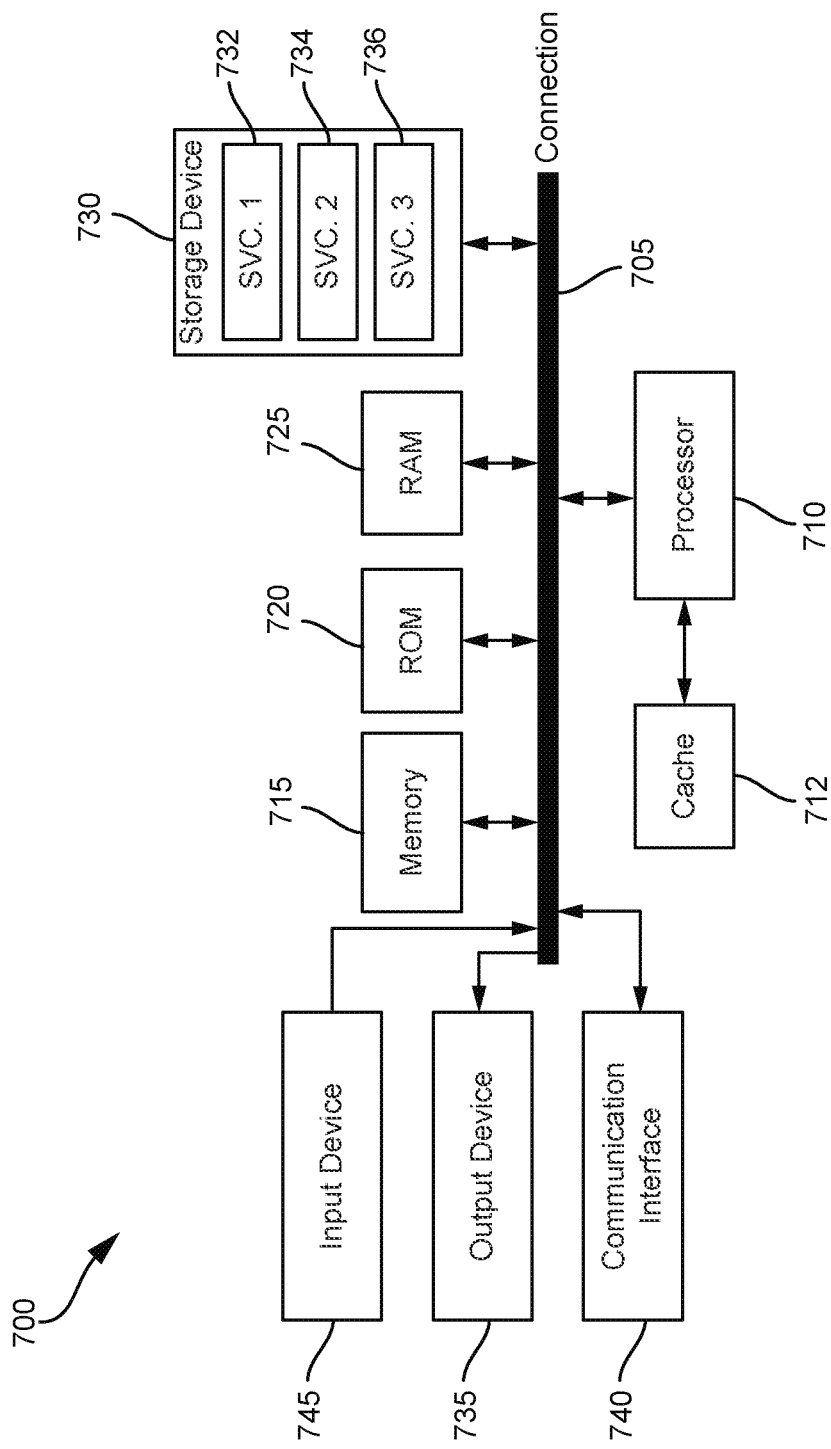
FIG. 7 illustrates an example processor-based system architecture for implementing certain aspects of the present disclosure.

FIG. 7 illustrates an example processor-based system with which some aspects of the subject technology can be implemented. For example, processor-based system 700 can be any computing device making up local computing device 110, one or more computers of data center 150, a passenger device (e.g., client computing device 170) executing the ridehailing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 702.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: memory; and one or more processors coupled to the memory, the one or more processors being configured to: obtain a first set of sensor data from a first sensor and a second set of sensor data from a second sensor; detect an object in the first set of sensor data and the object in the second set of sensor data; align the object in the first set of sensor data and the object in the second set of sensor data to a common time; and based on the aligned object from the first set of sensor data and the aligned object from the second set of sensor data, fuse the aligned object from the first set of sensor data and the aligned object from the second set of sensor data.

Aspect 2. The system of Aspect 1, wherein the common time comprises a future time relative to at least one of a time when the first set of sensor data was captured and an additional time when the second set of sensor data was captured, the time when the first set of sensor data was captured, or the additional time when the second set of sensor data was captured.

Aspect 3. The system of any of Aspects 1 or 2, wherein aligning the object in the first set of sensor data and the object in the second set of sensor data to the common time comprises aligning the object in the first set of sensor data and the object in the second set of sensor data to the common time using a prediction model, wherein the one or more processors are configured to further use the prediction model to perform at least one of tracking a state of the aligned object from the first set of sensor data and the aligned object from the second set of sensor data and generating, based on sensor data comprising at least one of the first set of sensor data and the second set of sensor data, planning data comprising at least one of a first instruction for performing an autonomous maneuver by an autonomous vehicle (AV), a second instruction for performing one or more mechanical operations by the AV, and one or more parameters for performing at least one of the autonomous maneuver and one or more AV operations.

Aspect 4. The system of any of Aspects 1 to 3, further comprising the first sensor and the second sensor, wherein at least one of the first sensor and the second sensor comprises at least one of a camera sensor, a radio detection and ranging (RADAR) sensor, a light detection and ranging (LIDAR) sensor, and an ultrasonic sensor.

Aspect 5. The system of any of Aspects 1 to 4, wherein fusing the aligned object from the first set of sensor data and the aligned object from the second set of sensor data comprises combining or merging the aligned object from the first set of sensor data and the aligned object from the second set of sensor data.

Aspect 6. The system of any of Aspects 1 to 5, wherein aligning the object in the first set of sensor data and the object in the second set of sensor data to the common time comprises: determining a first predicted trajectory of the object in the first set of sensor data; determining a second predicted trajectory of the object in the second set of sensor data; aligning the object in the first set of sensor data to the common time based on the first predicted trajectory; and aligning the object in the second set of sensor data to the common time based on the second predicted trajectory.

Aspect 7. The system of Aspect 6, wherein aligning the object in the first set of sensor data to the common time comprises projecting, based on the first predicted trajectory, the object from a time when the first set of sensor data was captured to the common time.

Aspect 8. The system of any of Aspects 6 or 7, wherein aligning the object in the second set of sensor data to the common time comprises projecting, based on the second predicted trajectory, the object from a time when the second set of sensor data was captured to the common time.

Aspect 9. The system of any of Aspects 6 to 8, wherein the first predicted trajectory comprises at least one of a first predicted location of the object in the first set of sensor data at the common time, a first velocity of the object in the first set of sensor data, and a first acceleration of the object in the first set of sensor data.

Aspect 10. The system of any of Aspects 6 to 9, wherein the second predicted trajectory comprises at least one of a second predicted location of the object in the second set of sensor data at the common time, a second velocity of the object in the second set of sensor data, and a second acceleration of the object in the second set of sensor data.

Aspect 11. The system of any of Aspects 6 to 10, wherein determining the first predicted trajectory of the object in the first set of sensor data comprises determining, based on at least one of the first set of sensor data and previous sensor data relative to the first set of sensor data, one or more motion vectors indicating a first motion of the object in the first set of sensor data.

Aspect 12. The system of any of Aspects 6 to 11, wherein determining the second predicted trajectory of the object in the second set of sensor data comprises determining, based on at least one of the second set of sensor data and previous sensor data relative to the second set of sensor data, one or more additional motion vectors indicating a second motion of the object in the second set of sensor data.

Aspect 13. The system of any of Aspects 1 to 12, wherein aligning the object in the first set of sensor data and the object in the second set of sensor data to the common time comprises aligning the object in the first set of sensor data and the object in the second set of sensor data to the common time using a prediction model.

Aspect 14. The system of Aspect 13, wherein the one or more processors are configured to use a different prediction model to perform at least one of tracking a state of the aligned object from the first set of sensor data and the aligned object from the second set of sensor data and generating, based on sensor data comprising at least one of the first set of sensor data and the second set of sensor data, planning data.

Aspect 15. The system of Aspect 14, wherein the planning data comprises at least one of a first instruction for performing an autonomous maneuver by an autonomous vehicle (AV), a second instruction for performing one or more mechanical operations by the AV, and one or more parameters for performing at least one of the autonomous maneuver and one or more AV operations, wherein the second prediction model is different from the first prediction model.

Aspect 16. A method comprising: obtaining a first set of sensor data from a first sensor and a second set of sensor data from a second sensor; detecting an object in the first set of sensor data and the object in the second set of sensor data; aligning the object in the first set of sensor data and the object in the second set of sensor data to a common time; and based on the aligned object from the first set of sensor data and the aligned object from the second set of sensor data, fusing the aligned object from the first set of sensor data and the aligned object from the second set of sensor data.

Aspect 17. The method of Aspect 16, wherein the common time comprises a future time relative to at least one of a time when the first set of sensor data was captured and an additional time when the second set of sensor data was captured, the time when the first sensor data was captured, or the additional time when the second set of sensor data was captured.

Aspect 18. The method of any of Aspects 16 or 17, wherein aligning the object in the first set of sensor data and the object in the second set of sensor data to the common time comprises aligning the object in the first set of sensor data and the object in the second set of sensor data to the common time using a prediction model.

Aspect 19. The method of Aspect 18, further comprising using the prediction model further to perform at least one of tracking a state of the aligned object from the first set of sensor data and the aligned object from the second set of sensor data and generating, based on sensor data comprising at least one of the first set of sensor data and the second set of sensor data, planning data.

Aspect 20. The method of Aspect 19, wherein the planning data comprises at least one of a first instruction for performing an autonomous maneuver by an autonomous vehicle (AV), a second instruction for performing one or more mechanical operations by the AV, and one or more parameters for performing at least one of the autonomous maneuver and one or more AV operations.

Aspect 21. The method of any of Aspects 16 to 20, wherein fusing the aligned object from the first set of sensor data and the aligned object from the second set of sensor data comprises combining or merging the aligned object from the first set of sensor data and the aligned object from the second set of sensor data.

Aspect 22. The method of any of Aspects 16 to 21, wherein at least one of the first sensor and the second sensor comprises at least one of a camera sensor, a radio detection and ranging (RADAR) sensor, a light detection and ranging (LIDAR) sensor, and an ultrasonic sensor.

Aspect 23. The method of any of Aspects 16 to 22, wherein aligning the object in the first set of sensor data and the object in the second set of sensor data to the common time comprises: determining a first predicted trajectory of the object in the first set of sensor data; determining a second predicted trajectory of the object in the second set of sensor data; aligning the object in the first set of sensor data to the common time based on the first predicted trajectory; and aligning the object in the second set of sensor data to the common time based on the second predicted trajectory.

Aspect 24. The method of Aspect 23, wherein aligning the object in the first set of sensor data to the common time comprises projecting, based on the first predicted trajectory, the object from a time when the first set of sensor data was captured to the common time.

Aspect 25. The method of any of Aspects 23 or 24, wherein aligning the object in the second set of sensor data to the common time comprises projecting, based on the second predicted trajectory, the object from a time when the second set of sensor data was captured to the common time.

Aspect 26. The method of any of Aspects 23 to 25, wherein the first predicted trajectory comprises at least one of a first predicted location of the object in the first set of sensor data at the common time, a first velocity of the object in the first set of sensor data, and a first acceleration of the object in the first set of sensor data.

Aspect 27. The method of any of Aspects 23 to 26, wherein the second predicted trajectory comprises at least one of a second predicted location of the object in the second set of sensor data at the common time, a second velocity of the object in the second set of sensor data, and a second acceleration of the object in the second set of sensor data.

Aspect 28. The method of any of Aspects 23 to 27, wherein determining the first predicted trajectory of the object in the first set of sensor data comprises determining, based on at least one of the first set of sensor data and previous sensor data relative to the first set of sensor data, one or more motion vectors indicating a first motion of the object in the first set of sensor data.

Aspect 29. The method of Aspect 29, wherein determining the second predicted trajectory of the object in the second set of sensor data comprises determining, based on at least one of the second set of sensor data and previous sensor data relative to the second set of sensor data, one or more additional motion vectors indicating a second motion of the object in the second set of sensor data.

30. The method of any of Aspects 16 to 29, wherein aligning the object in the first set of sensor data and the object in the second set of sensor data to the common time comprises aligning the object in the first set of sensor data and the object in the second set of sensor data to the common time using a prediction model, the method further comprising using the prediction model or a different prediction model to perform at least one of tracking a state of the aligned object from the first set of sensor data and the aligned object from the second set of sensor data and generating, based on sensor data comprising at least one of the first set of sensor data and the second set of sensor data, planning data.

31. The method of Aspect 30, wherein the planning data comprises at least one of a first instruction for performing an autonomous maneuver by an autonomous vehicle (AV), a second instruction for performing one or more mechanical operations by the AV, and one or more parameters for performing at least one of the autonomous maneuver and one or more AV operations, wherein the second prediction model is different from the first prediction model.

Aspect 32. A non-transitory computer-readable medium having stored thereon instructions which, when executed by one or more processing devices, cause the one or more processors to perform a method according to any of Aspects 16 to 31.

Aspect 33. A system comprising means for performing a method according to any of Aspects 16 to 31.

Aspect 34. A computer-program product comprising instructions which, when executed by one or more processing devices, cause the one or more processors to perform a method according to any of Aspects 16 to 31.

What is claimed is:
1. A system comprising:
memory; and
one or more processors coupled to the memory, the one or more processors being configured to:
obtain a first set of sensor data from a first sensor and a second set of sensor data from a second sensor;
detect an object in the first set of sensor data and the object in the second set of sensor data;
align, via a prediction model, the object in the first set of sensor data and the object in the second set of sensor data to a common time by:
determining a first predicted trajectory of the object in the first set of sensor data;
determining a second predicted trajectory of the object in the second set of sensor data;
aligning the object in the first set of sensor data to the common time based on the first predicted trajectory; and
aligning the object in the second set of sensor data to the common time based on the second predicted trajectory; and
based on the aligned object from the first set of sensor data and the aligned object from the second set of sensor data, fuse the aligned object from the first set of sensor data and the aligned object from the second set of sensor data.

2. The system of claim 1, wherein the common time comprises a future time relative to at least one of a time when the first set of sensor data was captured and an additional time when the second set of sensor data was captured, the time when the first set of sensor data was captured, or the additional time when the second set of sensor data was captured.

3. The system of claim 1, wherein aligning the object in the first set of sensor data and the object in the second set of sensor data to the common time comprises aligning the object in the first set of sensor data and the object in the second set of sensor data to the common time using the prediction model, wherein the one or more processors are configured to further use the prediction model to perform at least one of tracking a state of the aligned object from the first set of sensor data and the aligned object from the second set of sensor data and generating, based on sensor data comprising at least one of the first set of sensor data and the second set of sensor data, planning data comprising at least one of a first instruction for performing an autonomous maneuver by an autonomous vehicle (AV), a second instruction for performing one or more mechanical operations by the AV, and one or more parameters for performing at least one of the autonomous maneuver and one or more AV operations.

4. The system of claim 1, further comprising the first sensor and the second sensor, wherein at least one of the first sensor and the second sensor comprises at least one of a camera sensor, a radio detection and ranging (RADAR) sensor, a light detection and ranging (LIDAR) sensor, and an ultrasonic sensor, and wherein fusing the aligned object from the first set of sensor data and the aligned object from the second set of sensor data comprises combining or merging the aligned object from the first set of sensor data and the aligned object from the second set of sensor data.

5. The system of claim 1, wherein aligning the object in the first set of sensor data to the common time comprises projecting, based on the first predicted trajectory, the object from a time when the first set of sensor data was captured to the common time.

6. The system of claim 1, wherein aligning the object in the second set of sensor data to the common time comprises projecting, based on the second predicted trajectory, the object from a time when the second set of sensor data was captured to the common time.

7. The system of claim 1, wherein the first predicted trajectory comprises at least one of a first predicted location of the object in the first set of sensor data at the common time, a first velocity of the object in the first set of sensor data, and a first acceleration of the object in the first set of sensor data, and wherein the second predicted trajectory comprises at least one of a second predicted location of the object in the second set of sensor data at the common time, a second velocity of the object in the second set of sensor data, and a second acceleration of the object in the second set of sensor data.

8. The system of claim 1, wherein determining the first predicted trajectory of the object in the first set of sensor data comprises determining, based on at least one of the first set of sensor data and previous sensor data relative to the first set of sensor data, one or more motion vectors indicating a first motion of the object in the first set of sensor data, wherein determining the second predicted trajectory of the object in the second set of sensor data comprises determining, based on at least one of the second set of sensor data and previous sensor data relative to the second set of sensor data, one or more additional motion vectors indicating a second motion of the object in the second set of sensor data.

9. The system of claim 1, wherein aligning the object in the first set of sensor data and the object in the second set of sensor data to the common time comprises aligning the object in the first set of sensor data and the object in the second set of sensor data to the common time using a first prediction model, wherein the one or more processors are configured to use a different prediction model to perform at least one of tracking a state of the aligned object from the first set of sensor data and the aligned object from the second set of sensor data and generating, based on sensor data comprising at least one of the first set of sensor data and the second set of sensor data, planning data comprising at least one of a first instruction for performing an autonomous maneuver by an autonomous vehicle (AV), a second instruction for performing one or more mechanical operations by the AV, and one or more parameters for performing at least one of the autonomous maneuver and one or more AV operations, wherein the second prediction model is different from the first prediction model.

10. A method comprising:
obtaining a first set of sensor data from a first sensor and a second set of sensor data from a second sensor;
detecting an object in the first set of sensor data and the object in the second set of sensor data;
aligning, using a prediction model, the object in the first set of sensor data and the object in the second set of sensor data to a common time by:
determining a first predicted trajectory of the object in the first set of sensor data;
determining a second predicted trajectory of the object in the second set of sensor data;
aligning the object in the first set of sensor data to the common time based on the first predicted trajectory; and
aligning the object in the second set of sensor data to the common time based on the second predicted trajectory; and
based on the aligned object from the first set of sensor data and the aligned object from the second set of sensor data, fusing the aligned object from the first set of sensor data and the aligned object from the second set of sensor data.

11. The method of claim 10, wherein the common time comprises a future time relative to at least one of a time when the first set of sensor data was captured and an additional time when the second set of sensor data was captured, the time when the first sensor data was captured, or the additional time when the second set of sensor data was captured.

12. The method of claim 10, wherein aligning the object in the first set of sensor data and the object in the second set of sensor data to the common time comprises aligning the object in the first set of sensor data and the object in the second set of sensor data to the common time using the prediction model, the method further comprising using the prediction model further to perform at least one of tracking a state of the aligned object from the first set of sensor data and the aligned object from the second set of sensor data and generating, based on sensor data comprising at least one of the first set of sensor data and the second set of sensor data, planning data comprising at least one of a first instruction for performing an autonomous maneuver by an autonomous vehicle (AV), a second instruction for performing one or more mechanical operations by the AV, and one or more parameters for performing at least one of the autonomous maneuver and one or more AV operations.

13. The method of claim 10, wherein fusing the aligned object from the first set of sensor data and the aligned object from the second set of sensor data comprises combining or merging the aligned object from the first set of sensor data and the aligned object from the second set of sensor data, and wherein at least one of the first sensor and the second sensor comprises at least one of a camera sensor, a radio detection and ranging (RADAR) sensor, a light detection and ranging (LIDAR) sensor, and an ultrasonic sensor.

14. The method of claim 10, wherein aligning the object in the first set of sensor data to the common time comprises projecting, based on the first predicted trajectory, the object from a time when the first set of sensor data was captured to the common time.

15. The method of claim 10, wherein aligning the object in the second set of sensor data to the common time comprises projecting, based on the second predicted trajectory, the object from a time when the second set of sensor data was captured to the common time.

16. The method of claim 10, wherein the first predicted trajectory comprises at least one of a first predicted location of the object in the first set of sensor data at the common time, a first velocity of the object in the first set of sensor data, and a first acceleration of the object in the first set of sensor data, and wherein the second predicted trajectory comprises at least one of a second predicted location of the object in the second set of sensor data at the common time, a second velocity of the object in the second set of sensor data, and a second acceleration of the object in the second set of sensor data.

17. The method of claim 10, wherein determining the first predicted trajectory of the object in the first set of sensor data comprises determining, based on at least one of the first set of sensor data and previous sensor data relative to the first set of sensor data, one or more motion vectors indicating a first motion of the object in the first set of sensor data, wherein determining the second predicted trajectory of the object in the second set of sensor data comprises determining, based on at least one of the second set of sensor data and previous sensor data relative to the second set of sensor data, one or more additional motion vectors indicating a second motion of the object in the second set of sensor data.

18. A non-transitory computer-readable medium having stored thereon instructions which, when executed by one or more processing devices, cause the one or more processing devices to:
- obtain a first set of sensor data from a first sensor and a second set of sensor data from a second sensor;
- detect an object in the first set of sensor data and the object in the second set of sensor data;
- align the object in the first set of sensor data and the object in the second set of sensor data to a common time by:
  - determining a first predicted trajectory of the object in the first set of sensor data;
  - determining a second predicted trajectory of the object in the second set of sensor data;
  - aligning the object in the first set of sensor data to the common time based on the first predicted trajectory; and
  - aligning the object in the second set of sensor data to the common time based on the second predicted trajectory; and
- based on the aligned object from the first set of sensor data and the aligned object from the second set of sensor data, fuse the aligned object from the first set of sensor data and the aligned object from the second set of sensor data.

* * * * *